(12) United States Patent
Ford

(10) Patent No.: US 11,336,455 B2
(45) Date of Patent: May 17, 2022

(54) CONSENSUS PROTOCOL FOR BLOCKCHAIN DAG STRUCTURE

(71) Applicant: International Business Machines Corporation, Armonk, NY (US)

(72) Inventor: Daniel Ford, Mount Kisco, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/583,239

(22) Filed: Sep. 25, 2019

(65) Prior Publication Data

US 2021/0091957 A1 Mar. 25, 2021

(51) Int. Cl.
*H04L 9/32* (2006.01)
*H04L 9/06* (2006.01)
*H04L 29/08* (2006.01)
*H04L 67/1061* (2022.01)

(52) U.S. Cl.
CPC .......... *H04L 9/3239* (2013.01); *H04L 9/0637* (2013.01); *H04L 9/0643* (2013.01); *H04L 67/1065* (2013.01); *H04L 2209/38* (2013.01)

(58) Field of Classification Search
CPC ... H04L 9/3239; H04L 9/0637; H04L 9/0643; H04L 67/1065; H04L 2209/38; H04L 9/0855; H04L 9/3247; H04L 9/3263; H04L 67/10; G06F 16/9024; G06F 21/64
See application file for complete search history.

(56) References Cited

U.S. PATENT DOCUMENTS

| | | | |
|---|---|---|---|
| 8,677,336 B2 | 3/2014 | Richins | |
| 10,445,698 B2* | 10/2019 | Hunn | G06F 16/219 |
| 11,157,899 B1* | 10/2021 | Nelson | G06F 9/4401 |
| 2015/0067088 A1* | 3/2015 | Guerin | G06F 16/9014 709/213 |
| 2017/0316391 A1* | 11/2017 | Peikert | G06Q 20/382 |
| 2018/0337847 A1 | 11/2018 | Li et al. | |
| 2019/0042619 A1 | 2/2019 | Baird, III | |
| 2019/0149429 A1* | 5/2019 | Stocker | H04L 67/104 709/225 |

(Continued)

FOREIGN PATENT DOCUMENTS

| | | |
|---|---|---|
| CN | 109150972 A | 1/2019 |
| CN | 109377232 A | 2/2019 |

(Continued)

OTHER PUBLICATIONS

Ford, "System and method for extracting a consensus total order from a gossip DAG.",. IBM T. J. Watson Research Center, date unknown.

(Continued)

*Primary Examiner* — Nasser M Goodarzi
*Assistant Examiner* — Adil Ocak

(57) ABSTRACT

An example operation may include one or more of receiving a chain of blocks from a blockchain comprising a directed acyclic graph (DAG) format in which blocks are independently hash-linked to multiple blocks, identifying temporal relationships between blocks in the chain of blocks based on a structure of the chain of blocks in the DAG format, determining a sequential linear order of the chain of blocks in the DAG format based on the identified temporal relationships, and storing the sequential linear order of the chain of blocks.

20 Claims, 25 Drawing Sheets

(56) References Cited

U.S. PATENT DOCUMENTS

| | | | | |
|---|---|---|---|---|
| 2019/0279204 A1* | 9/2019 | Norton | ............... | G06Q 20/389 |
| 2020/0013027 A1* | 1/2020 | Zhu | ................. | G06Q 20/0658 |
| 2020/0076576 A1* | 3/2020 | Ahlback | ............. | H04L 9/3297 |
| 2020/0287788 A1* | 9/2020 | Triplet | ................ | H04L 41/082 |
| 2020/0294152 A1* | 9/2020 | Fletcher | ............. | G06Q 40/08 |
| 2020/0374106 A1* | 11/2020 | Padmanabhan | ..... | H04L 63/0428 |
| 2020/0374340 A1* | 11/2020 | Novotny | ........... | H04L 67/1042 |

FOREIGN PATENT DOCUMENTS

| | | | |
|---|---|---|---|
| CN | 109413202 A | 3/2019 | |
| CN | 109672733 A | 4/2019 | |
| CN | 109710387 A | 5/2019 | |

OTHER PUBLICATIONS

International Search Report and Written Opinion issued in the International Application No. PCT/EP2020/075398, dated Nov. 17, 2020.

Shengsheng et al., Multi-feature and DAG-Based Multi-tree Matching Algorithm for Automatic Web Data Mining, 2014 IEEE/WIC/ACM International Joint conferences on Web Intelligence (WI) and Intelligent Agent Technologies (IAT), IEEE, vol. 1, Aug. 11, 2014, pp. 118-125.

Sompolinsky et al., Phantom: A Scalable BlockDAG Protocol,, IACR, International Assoication for Cryptologic Research, vol. 2018529:083501. Mar. 30, 2018, pp. 1-26.

\* cited by examiner

Blockchain Ledger
120A

Gossip Protocol

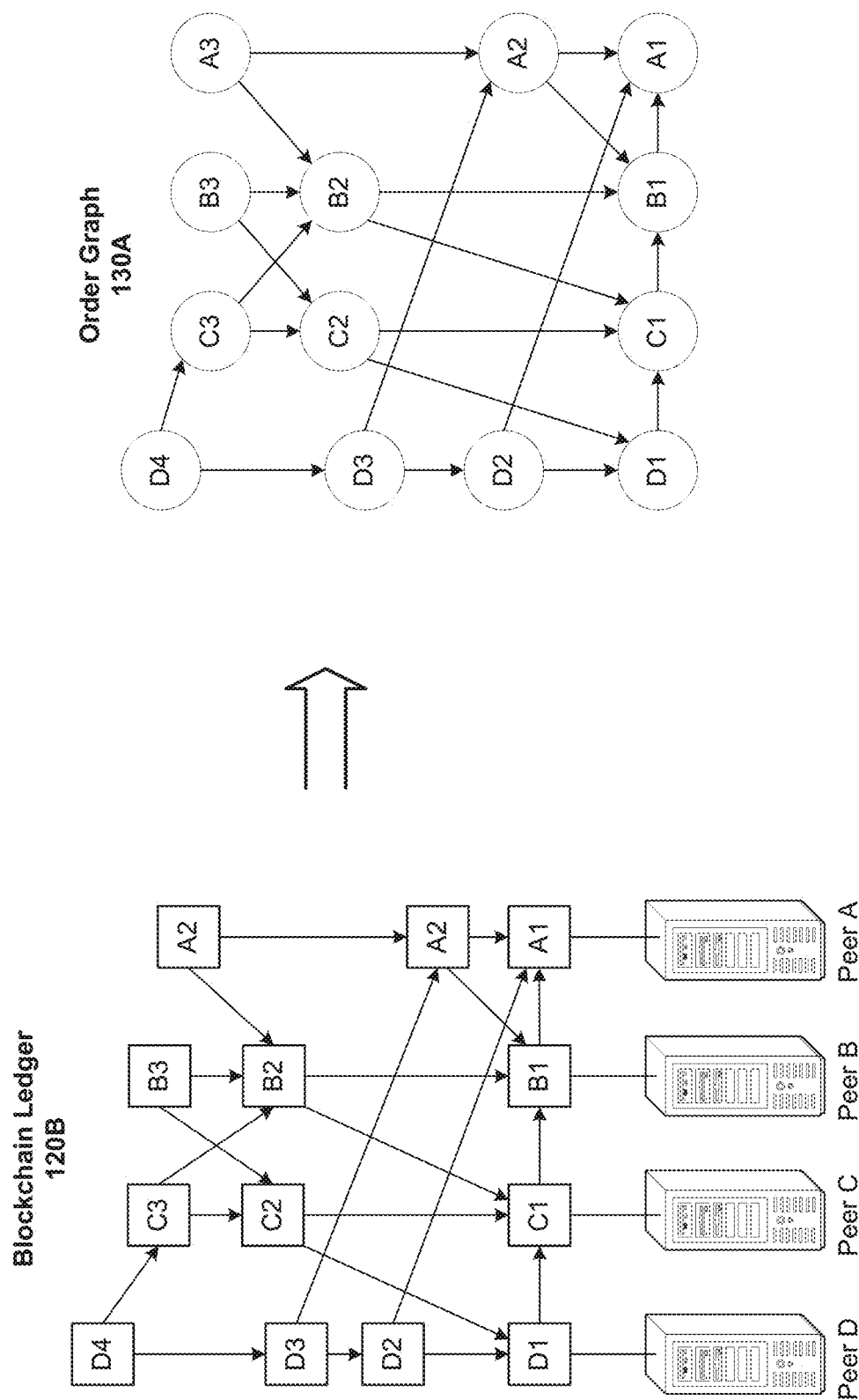

Order Graph
400A

410

Order Graph
400B

420

Cycle Transform

422

Order Graph
400C

430 FIG. 4D
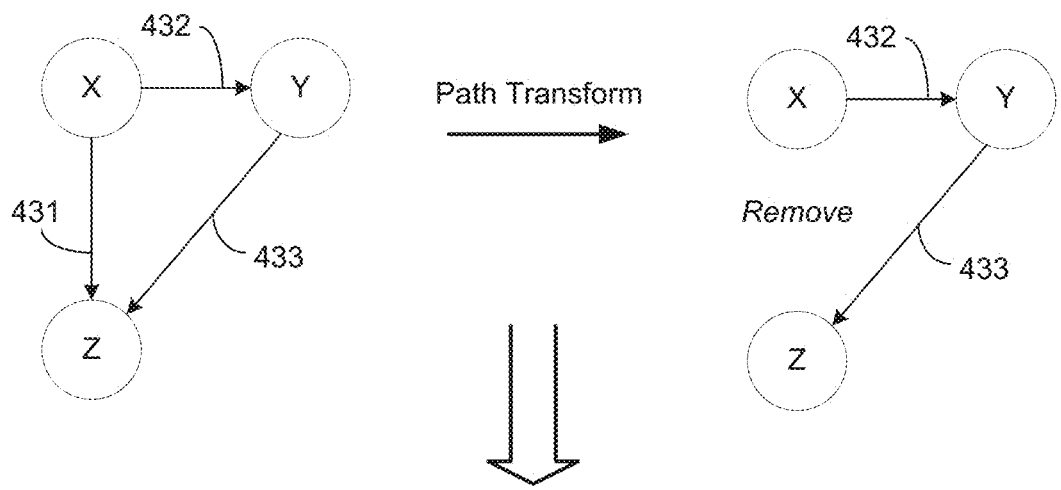
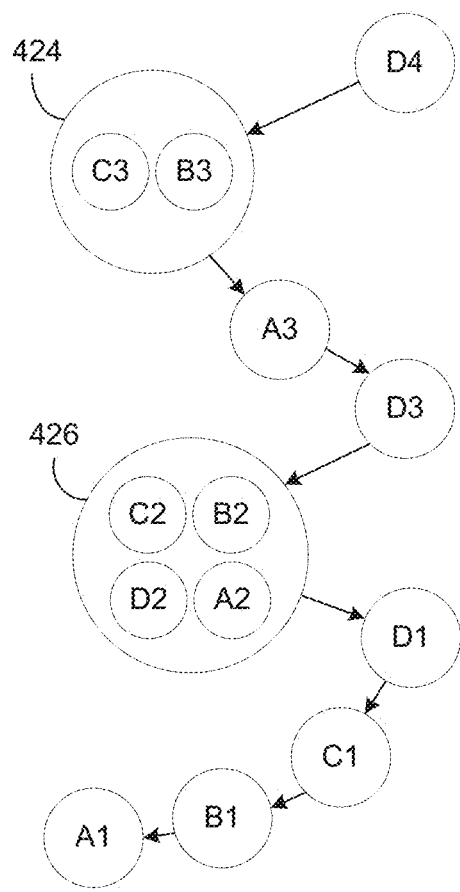
Order Graph
400D

440

Order Graph
400E

CONSENSUS PROTOCOL FOR BLOCKCHAIN DAG STRUCTURE

TECHNICAL FIELD

This application generally relates to a system for storing data via blockchain, and more particularly, to a consensus protocol for determining a sequential order of blocks from a blockchain ledger in a directed acyclic graph format.

BACKGROUND

A centralized database stores and maintains data in a single database (e.g., a database server) at one location. A centralized database is easy to manage, maintain, and control, especially for purposes of security because of its single location. However, a centralized database suffers from significant drawbacks. For example, a centralized database has a single point of failure. If a hardware failure occurs, all data within the database is lost and work of all users is interrupted. In addition, a centralized database can be highly dependent on network connectivity. Therefore, the slower the connection, the amount of time needed for each database access is increased. Furthermore, a centralized database provides limited access to data because only one copy of the data is capable of being worked on at any given time. Furthermore, because a database storage system has minimal to no data redundancy, data that is unexpectedly lost is very difficult to retrieve other than through manual operation from back-up storage.

Recently, organizations have been turning to blockchain as an improved storage system over a traditional database. Blockchain offers data redundancy, no central authority, multiple nodes of access, and the like. A traditional blockchain stores data blocks in a linear sequence where each block is hash-linked to the previous block, and so on. In order to add a new block to the sequence, a consensus protocol must be performed to verify the integrity of the ledger. In permissionless blockchains the consensus protocol may be a "proof of work" whereas in a permissioned blockchain the consensus protocol may be an endorsement/voting process. These processes are typically slow. To speed-up the process of adding a block, a blockchain may implement a directed acyclic graph (DAG) format. This can be accomplished by allowing blocks to be added without hindrance of extra computation (such as proof of work or voting/endorsement). However, the resulting blockchain is tangle ribbon of blocks woven together in a random manner that can be difficult to obtain a consensus order from.

As such, what is needed is a solution that improves the consensus protocol of a DAG-based blockchain and overcomes these drawbacks and limitations.

SUMMARY

One example embodiment provides a system that includes one or more of a processor configured to one or more of receive a chain of blocks from a blockchain which comprises a directed acyclic graph (DAG) format in which blocks are independently hash-linked to multiple blocks, identify temporal relationships between blocks in the chain of blocks based on a structure of the chain of blocks in the DAG format, and determine a sequential linear order of the chain of blocks in the DAG format based on the identified temporal relationships, and a storage configured to store the sequential linear order of the chain of blocks.

Another example embodiment provides a method that includes one or more of receiving a chain of blocks from a blockchain comprising a directed acyclic graph (DAG) format in which blocks are independently hash-linked to multiple blocks, identifying temporal relationships between blocks in the chain of blocks based on a structure of the chain of blocks in the DAG format, determining a sequential linear order of the chain of blocks in the DAG format based on the identified temporal relationships, and storing the sequential linear order of the chain of blocks.

A further example embodiment provides a non-transitory computer readable medium comprising instructions, that when read by a processor, cause the processor to perform one or more of receiving a chain of blocks from a blockchain comprising a directed acyclic graph (DAG) format in which blocks are independently hash-linked to multiple blocks, identifying temporal relationships between blocks in the chain of blocks based on a structure of the chain of blocks in the DAG format, determining a sequential linear order of the chain of blocks in the DAG format based on the identified temporal relationships, and storing the sequential linear order of the chain of blocks.

BRIEF DESCRIPTION OF THE DRAWINGS

FIG. 1C is a diagram illustrating a different view of the order graph shown in FIG. 1B according to example embodiments.

FIG. 4D is a diagram illustrating a process of performing a path transform on nodes in the order graph according to example embodiments.

DETAILED DESCRIPTION

Figure 1A:
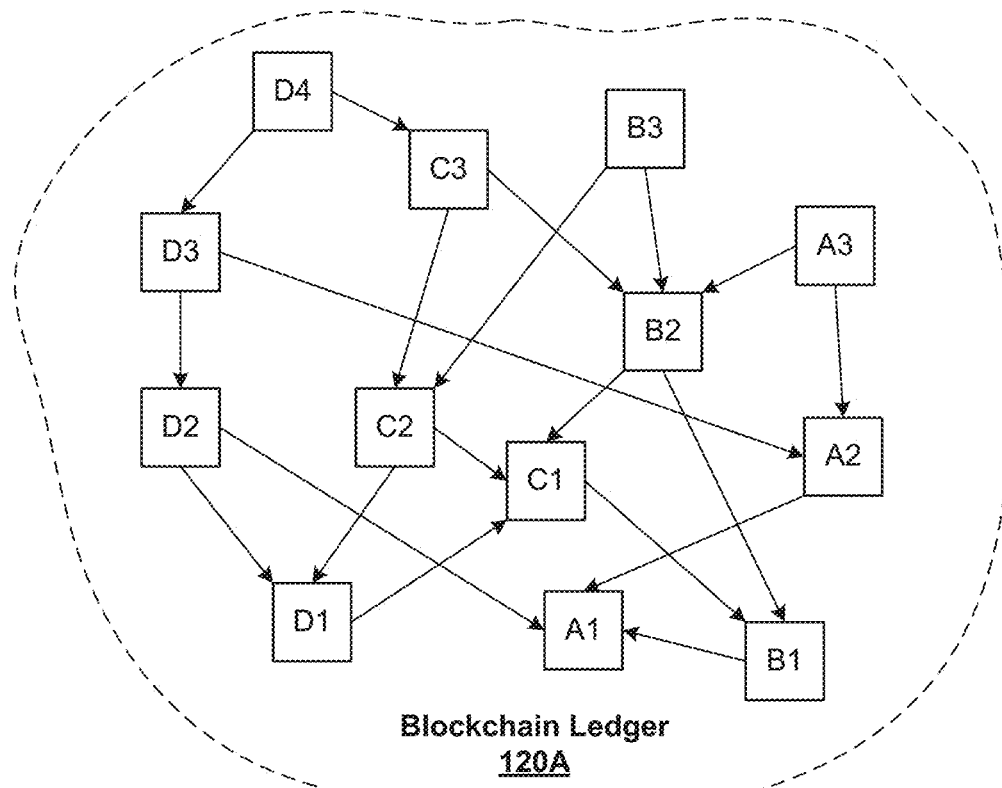
FIG. 1A is a diagram illustrating a blockchain ledger in a DAG format according to example embodiments.
Figure 1A:
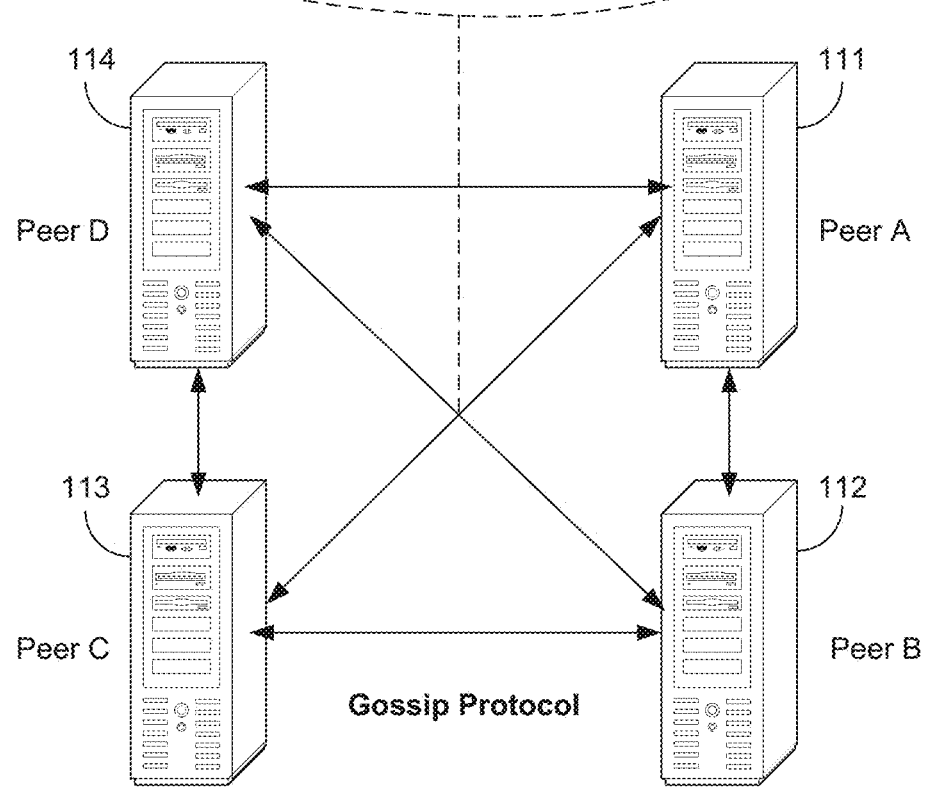

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined or removed in any suitable manner in one or more embodiments. Further, in the diagrams, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

In addition, while the term "message" may have been used in the description of embodiments, the application may be applied to many types of networks and data. Furthermore, while certain types of connections, messages, and signaling may be depicted in exemplary embodiments, the application is not limited to a certain type of connection, message, and signaling.

Example embodiments provide methods, systems, components, non-transitory computer readable media, devices, and/or networks, which provide a security layer for configuring a blockchain network (also referred to herein as a blockchain.)

In one embodiment the system deploys and configures a decentralized database (such as a blockchain) that is a distributed storage system, which includes multiple nodes that communicate with each other. The decentralized database includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In various embodiments, a permissioned and/or a permissionless blockchain can be used. In a public or permission-less blockchain, anyone can participate without a specific identity. Public blockchains can involve native cryptocurrency and use consensus based on various protocols such as Proof of Work (PoW). On the other hand, a permissioned blockchain database provides secure interactions among a group of entities which share a common goal but which do not fully trust one another, such as businesses that exchange funds, goods, information, and the like.

The blockchain may operate arbitrary, programmable logic, tailored to a decentralized storage scheme and referred to as "smart contracts" or "chaincodes." In some cases, specialized chaincodes may exist for management functions and parameters which are referred to as system chaincode. The application can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed" before being committed to the blockchain while transactions, which are not endorsed, are disregarded. An endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

The blockchain can include nodes configured therein that are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

The blockchain may include a ledger that is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). Each participating party (such as a peer node) can maintain a copy of the ledger. A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain.

The chain (of the blockchain) is a transaction log which is structured as hash-linked blocks, and each block contains a sequence of N transactions where N is equal to or greater than one. The block header includes a hash of the block's transactions, as well as a hash of the prior block's header. As another example, in a DAG structure, the block includes a hash of a parent block's header and a hash of a source block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Since the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

The example embodiments are directed towards a consensus protocol for a blockchain having a direct acyclic graph (DAG) format. In particular, the protocol can untangle the blocks in the DAG format to generate a sequential linear order of blocks which can be used for consensus among peer nodes in the blockchain network. However, rather than rely on timestamps (which are easy to fake), the protocol analyzes the structure of the DAG to resolve implicit, redundant, and arbitrary relationships within the graph.

The approach is unique because the DAG structure of blocks can be transformed into a linear structure by examining the structure, and only the structure, of the DAG. The blocks are hash-linked to each other as in a traditional blockchain. However, in the DAG structure, a block can be directly/independently linked to more a plurality of blocks by including a hash of the plurality of blocks in the block header. The system described herein may convert the DAG block structure into a corresponding graph (referred to herein as an order graph) in which blocks are represented by nodes and links are represented by edges between the nodes. Through the order graph, transformations on the nodes may be performed based on various transforms.

The example embodiments make the addition of blocks to a blockchain much faster than a traditional blockchain were blocks are in sequential linear order to begin with. This is accomplished by allowing the blocks to be added without any hindrance by multiple peer nodes, in parallel. Without hindrance means that there is no extra "proof-of-work" computation added to the process to slow the process down (which is the case for conventional blockchains like Bitcoin). Furthermore, there is no need for the computers to "vote" on the additions being made. Instead the set of computers operating in parallel "gossip" between themselves, meaning they make random pair wise connections between each other, in parallel. Each such connection causes one block to be created and added to the DAG of blocks. The process is significantly faster than relying on proof-of-work or endorsement protocols, but the end result is a "ribbon" of blocks that are woven together in a completely random manner making it difficult to determine the temporal order in which the blocks were created. This order, called the "consensus total order," specifies the order of the transactions (stored in the blocks), which is at the core of the blockchain.

Another approach to address the process of untangling the blocks in a DAG structure would be to use the timestamps in each block to figure out the temporal order. However, timestamps are easy to fraudulently create, fake, manipulate, etc. Therefore, timestamps cannot be trusted fully unless additional/complicated processes are implemented to identify a "good" set of timestamps. In contrast, the example embodiments identify the sequential order of blocks using only a structure of the DAG itself, which isn't something that can be faked.

For example, a peer node may store the DAG chain of blocks. When a consensus request is received, the peer node may convert the newest structure of the DAG to the order graph in which blocks are represented by nodes, and hash links are represented with edges between the nodes. Note that the order graph is not a DAG, it can and will contain cycles. The peer node may perform transformations on the order graph (e.g., add or remove edges) that preserve the corresponding temporal relationships between the blocks/nodes, but which also systematically reduce the number of edges between the nodes. Blocks in the DAG may include two edges to two other blocks (one to a parent node and one to a cross-relationship node/source). However, in the consensus total order, there will only be one remaining edge between those two states. The transformations can be performed on the order graph structure to transform it into a linear structure in which the order of its nodes represent the temporal/linear order of each node's corresponding block in the DAG. Further, once this is established, those nodes, now in order, can be removed from the order graph as they serve no further purpose. Removal of ordered nodes prevents the order graph from growing beyond what is necessary.

Some of the benefits of the example embodiments include improving the processing speed of the blockchain. In particular, the addition of new blocks to the blockchain (DAG) may be separated from the process of determining the consensus total order of the blocks (i.e., by transforming the order graph). In particular, blocks can be added as fast as needed (by multiple different peers at once), and the ordering process may be performed separately, and in parallel, using static analysis of the structure of the order graph. The combination is much faster than requiring a proof-of-work or endorsement protocol before a block can be added to the blockchain.

A peer node may execute the consensus protocol throughout its process of managing the blockchain. A peer node includes different jobs such as accepting transactions, bundling the transactions into blocks, coming to an agreement (i.e., a consensus) with the other peers that are doing the same thing in parallel on what the order of the blocks that they are all creating should be. That consensus requires the execution of the consensus protocol. In practice/implementation, the only time anything happens is when a new block is added to the DAG which then directly results in a new corresponding block in the order graph. If the new order graph block makes a transformation, or transformations, possible, those transformations are then applied and the order graph is changed. If the change results in a node that has no nodes that proceed it (i.e., nothing that comes before it temporally), and only one that comes after it, the node can be removed from the order graph and its position in the sequence of nodes so removed is its position in the consensus total order (which translates directly to the position of the block in the DAG that it represents in the consensus total order).

As noted above, blockchains in general can be categorized into two types, permissionless and permissioned. The first widely used blockchains, Bitcoin and Ethereum, are both permissionless, meaning that no centralized authority manages the peer-to-peer network that maintains the blockchain, and, that virtually any peer can join the network, at any time, to participate in its maintenance. In contrast, a permissioned blockchain generally has a very limited number of peers maintaining it, perhaps just a dozen, that are owned and operated by specific known parties, and, who have been granted "permission" by some centralized authority to maintain the blockchain. These two types of blockchains tend to have very different approaches to consensus formation, and, consequently, very different performance profiles. However, the consensus protocols of both types of network require significant overhead work to be performed prior to a new block being stored on the ledger.

A third approach to determining consensus in a blockchain, applicable to both permissionless and permissioned blockchains, is to separate the extension of the blockchain from the determination of consensus. The idea is to achieve higher performance by allowing the parallel addition of blocks to the "chain" with few, if any artificial time delays or constraints. In this example, consensus may be determined in parallel, and just slightly after-the-fact, through static analysis of the relationships between the blocks. This is facilitated by adopting a slightly different data structure than a pure blockchain, namely a generalized directed acyclic graph (DAG), to organize the blocks. FIG. 1A illustrates a blockchain ledger 120 in a DAG format according to example embodiments.

Referring to FIG. 1A, a blockchain network 100 including a plurality of peer nodes 111-114 represented by peers A, B, C, and D, respectively. The consensus protocol described herein can be used to untangle the chain of blocks in the DAG format on the blockchain ledger 120A. The DAG protocol still uses cryptographic checksums to link the blocks together, the same as with a conventional blockchain, but may incorporate links to two or more blocks rather than just a link to an immediately previous block. For example, new blocks may be appended to the "outermost" blocks in the DAG which creates a stable, unchanging, "core" of blocks that facilitates the static analysis. In the example of FIG. 1A, each peer adds its own blocks to the DAG. In this example, peer 114 (also referred to as peer D) has added four blocks to the blockchain ledger 120A including D1, D2, D3, and D4. Likewise, peer 113 (peer C) has added blocks C1, C2, and C3, peer 112 (peer B) has added blocks B1, B2, and B3, and peer 111 (peer A), has added blocks A1, A2, and A2.

Peers 111-114 can add new blocks to the DAG with very little overhead, typically no Proof-of-Work, nor any voting among the peers 111-114. As a non-limiting example, in the "simplest" algorithm, peers 111-114 may just append, and propagate their additions to other peers among the peers 111-114. This arrangement allows for simultaneous parallel extension of the DAG by multiple peers, and much higher performance. Here, static analysis may be used to process the stable portion of the DAG, at its "leisure," to sort out the extension order and produce a consensus total order. This approach has some latency (seconds), but it allows for very high performance.

Using an unconstrained DAG for the blockchain ledger 120A rather than the sequential chain of blocks, enables the peers 111-114 to attach blocks virtually wherever they think best. The DAG also offers a path to very high, potentially even theoretical maximum, extension performance. This approach, however, has two prominent drawbacks, the first is that the DAGs so created can have very complex sets of block relationships, and, the second, and more insidious, is that it can make a ledger that makes use of such a structure more vulnerable to attack. As the complexity of the DAG increases so does the difficulty of performing the static analysis. This can lead to extended latency in computing the consensus order from the DAG. Also, while not specifically an algorithmic issue, per se, correct implementation of a complex static analysis algorithm can also be a challenge to get right. Finally, with greater complexity comes the greater possibility of unforeseen issues with security.

One such issue is that the lack of some kind of mandated coordination between the peers extending the DAG opens up a possibility for malicious peers collaborating among themselves without being noticed. The danger is that the peers would work together on extending a portion of the DAG to their own benefit (e.g., to perpetrate a "double spend"). In an unconstrained DAG, this extension need not be immediately propagated to the rest of the peers, and so can be maliciously curated and introduced (i.e., propagated to the rest of the peer-to-peer network) at a time that maximizes impact. Attempts to mitigate these types of attacks can have profound implications for the design and operation of the DAG, effectively converting some decentralized (i.e., permissionless) ledgers into centralized (i.e., permissioned) ones. Constraining the extension of the DAG such that it contains more structure, while still allowing unhindered extension, helps to address these issues.

Figure 1B:
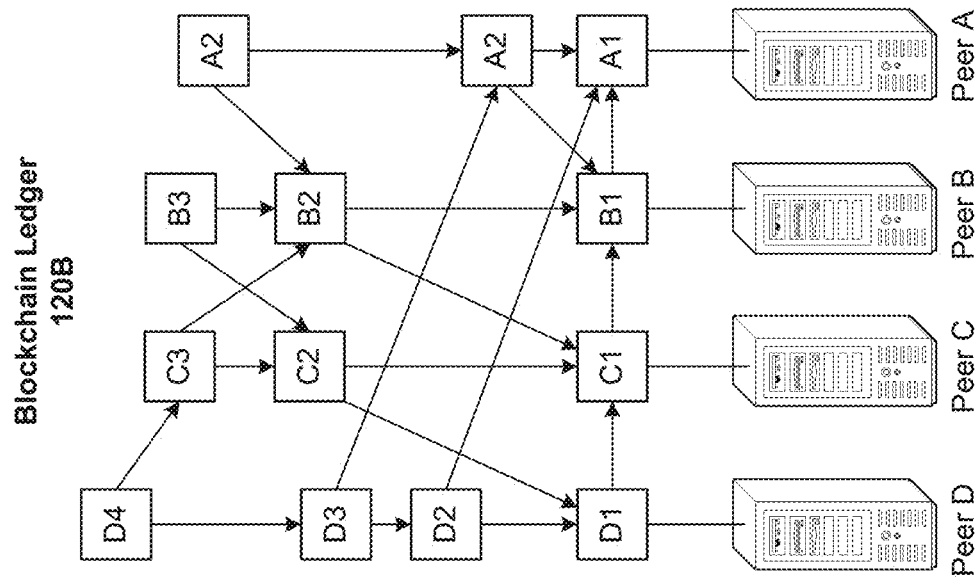
FIG. 1B is a diagram illustrating a process of converting the blockchain in FIG. 1A to an order graph in DAG format according to example embodiments.
Figure 1B:
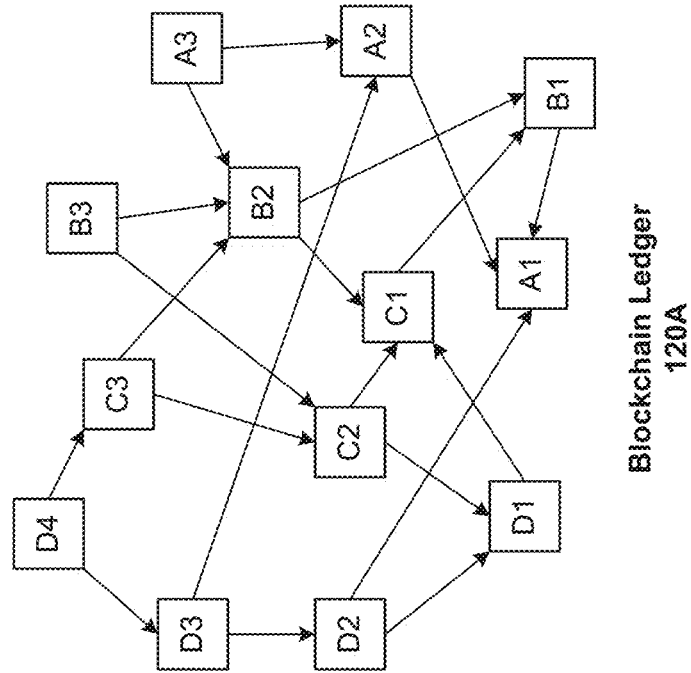

FIG. 1B illustrates another perspective of the blockchain ledger 120B in which the blocks are arranged in correspondence to the peers that added the corresponding blocks to the blockchain ledger 120B. As shown in FIG. 1B, the gossip DAG records the random connections made between the set of peers A-D participating in a gossip protocol (i.e., each peer randomly selects another peer, and then contacts them to synchronize their respective data sets). The blocks in the gossip DAG contain transactions placed there by the peer that creates them. The connections between the peers are secure, and the data exchanged (i.e., the blocks) are signed. The DAG may be observed to be organized as if it consisted of a parallel set of conventional blockchains, one blockchain being "owned" by each of the peers A-D.

Here, peer C owns the "chain" consisting of blocks C1, C2, and C3, while peer A owns the chain consisting of blocks A1, A2, and A3. The blocks in a particular peer's chain each have a link to the block that immediately precedes it in that chain. This block is called its parent, while said block is the child in the relationship. Not all blocks will have a parent. For example, blocks corresponding to nodes D1, C1, B1, and A1 in the blockchain ledger 120B do not have parent blocks.

Each block typically has another link to a block in a different peer's chain. The linking block in the other chain is referred to as a source block. Blocks can only be the parent to one other block, but they can be a source block to more than one, for example, block B2 in the blockchain ledger 120B is the parent of block B3, and the source block for blocks A3 and C3. As noted above, blocks in the gossip DAG are created when one peer contacts another, for example, block D2 was created when peer A contacted peer D. When that connection is being made, peer A may send the cryptographic hash value of block A1 (the source block) to peer D, which, in turn, creates block D2, including in block D2 the cryptographic hash values for block A1 and for block D1 (the parent block).

When two peers communicate, they may exchange the blocks of the DAG that the other peer is missing. This may be accomplished by the initiating peer sending an instance of a Block Count Vector (BCV), which summarizes the maximum index of the blocks belonging to each peer. The receiving peer compares the values to its own, and replies with any blocks it has that the other does not, and its own BCV value, to which it will receive a reply with appropriate blocks it is missing if available. As an example, the very first BCV sent in the first synchronization from peer A to peer B may summarize peer A's view of the gossip DAG, which is that peer A has a single block (A1, the genesis block it just created, described later), and that, as far as it knows, the other three peers have zero ("0") blocks (true). In addition to the BCV, Peer A may also proactively send block A1, the source block, to peer B. Note that in general, it is possible, but rare, that the receiving peer would already have the source block, which would be the case if it had been contacted twice in a row by the same peer that itself had not been contacted in between the two exchanges.

When peer B receives the BCV and block A1 from peer A, it adds block A1 to its collection, and then creates block B1. It then creates its own BCV, summarizing its view of the gossip DAG, and compares it to the one it received from peer A. The difference (basically vector subtraction) between the two BCV's identifies which blocks in the gossip DAG that peer B has that peer A does not (answer: block B1). In this example, peer B replies to peer A with its BCV, and block B1. When peer A receives the response from peer B, it integrates any blocks it receives from peer B (just block B1 this time) and then recomputes its BCV with the new blocks. It then prepares its response, the objective of which is to provide peer B with any gossip DAG blocks that peer A has that peer B does not. Again, this is revealed by computing the difference between the two BCV vectors, which in this case produces no differences, so there are no blocks to send to peer B. The lack of blocks to transfer does not affect the peer A's actions, it still sends a reply back to peer B, just with no blocks. After the completion of that response the gossip exchange between the two peers is complete.

The blockchain consensus algorithm described herein leverages the characteristics of a gossip DAG, but with a few customizations. For instance, all of the blocks in the gossip DAG can trace a path to a single genesis block (A1). This block is created as part of an initialization process by a single, designated, peer (peer A). Meanwhile, after initialization, the other peers still do not have references to any other blocks. Gossiping begins with the peer that created the genesis block, and only that peer, randomly contacting another peer. That peer, in keeping with the gossip protocol, creates a new block that references the genesis block as its source, but leaves the parent reference empty (because there is no parent block to reference). After synchronization, the second peer, now has a block of its own, and can join the first peer in initiating gossip connections to the other peers. As each peer is contacted, and subsequently creates a new block that can serve as a source block, it can join the other peers in gossiping.

The path to the genesis block can be extracted directly from the structure of the gossip DAG, and, so, there needs to be a block that is the actual first block, one that comes before all others in the consensus total order. Note that, the actual time a block is created is not part of the ordering process. In other words, the protocol herein does not require timestamp information. At first glance, a gossip DAG appears random and unorganized. This is a relatively accurate assessment, the blocks and their interconnecting edges are created randomly, and follow no particular pattern, except that each new block always references the most recent blocks of both its parent and source peers. This one characteristic allows a semantically consistent temporal order of the blocks in the gossip DAG to be extracted directly from its structure. This is accomplished by recognizing the full extent of the relative temporal relationships encoded in the gossip DAG structure, and using them to produce a total ordering of all blocks that is consistent with those relative relationships.

There are four kinds of relative temporal order relationships encoded in a gossip DAG, ones that are explicit, ones that are implicit, ones that are arbitrary, and ones that are redundant. The explicit relationships are those that are directly represented by an edge from one block to another. For example, in FIG. 1B, block D2 is temporally after blocks D1 and A1 because there is a directed edge from block D2 to each of the two other blocks.

The implicit temporal relationships are, unsurprisingly, more subtle, the most obvious are transitive temporal relationships, for instance if block A has an edge to block B, and block B has an edge to block C (i.e., A→B→C), then there is an implicit relationship between block A and block C (block A was created after block C). As an example, in FIG. 1B, there is an implicit temporal relationship between block D3 and block D1. The gossip DAG also contains another type of implicit temporal relationship related to the dual role played by blocks that act as both parents and sources. This relationship is further described with reference to FIGS. 4A-4E when discussing the parent transform.

An arbitrary temporal relationship between two blocks in the gossip DAG is one where no explicit or implicit temporal order is represented. These arbitrary relationships are useful when determining a total order of the blocks as they allow a degree of flexibility that can be exploited to simplify the relationships. Arbitrary temporal relationships can be hard to spot directly in the gossip DAG, usually requiring implicit relationships to be made explicit by a transform in the order graph before they become more obvious.

Redundant temporal relationships are ones where more than one path exists between blocks, for example, block A has an edge to block B, and block B has an edge to block C, and, block A also has a (redundant) edge to block C (i.e., A→B→C & A→C). In this example, the redundant edge between A and C can be removed. Compared to a total order, a gossip DAG has almost exactly twice the number of edges (not exactly twice because the first blocks of each peer do not have a parent block and so only have one edge each which is not deleted). In particular, a new block refers to its parent block in the same peer's chain and its source block in another peer's chain. Therefore, when creating a sequential order of blocks, almost half of the edges need to be removed before the consensus total order can be produced.

The solution to the problem of efficient extraction of a consensus total order for a set of transactions from a recorded gossip protocol exchange between a cooperating set of peers, is to use the gossip DAG of blocks to create a record of the gossip connections that were made, and then use a second, modifiable, graph (referred to herein as an order graph) to change the structure of that record into a linear one while preserving the semantics of the temporal relationships contained therein.

FIG. 1C illustrates a process of converting the blockchain ledger 120B of blocks in a DAG format on a blockchain in FIG. 1B to an order graph 130A in DAG format according to example embodiments. In this example, the order graph 130A substitutes nodes for blocks. Furthermore, the links between the blocks are represented with edges. The order graph 130A is essentially a clone of the DAG format of blocks on the blockchain ledger 120B. However, the order graph 130 is capable of being manipulated to perform transformations unlike positions of blocks on a blockchain. The order graph 130A is a modifiable graph, whose contents are extracted from the gossip DAG, and an accessory set of transformations, and how to use those transformations to iteratively alter the structure of the order graph 130A in order to make it successively more linear until the nodes of the second graph form a linear sequence as shown in the order graph 130B shown in FIG. 1D, that corresponds to the consensus total order of the blocks in the gossip DAG.

Figure 1D:
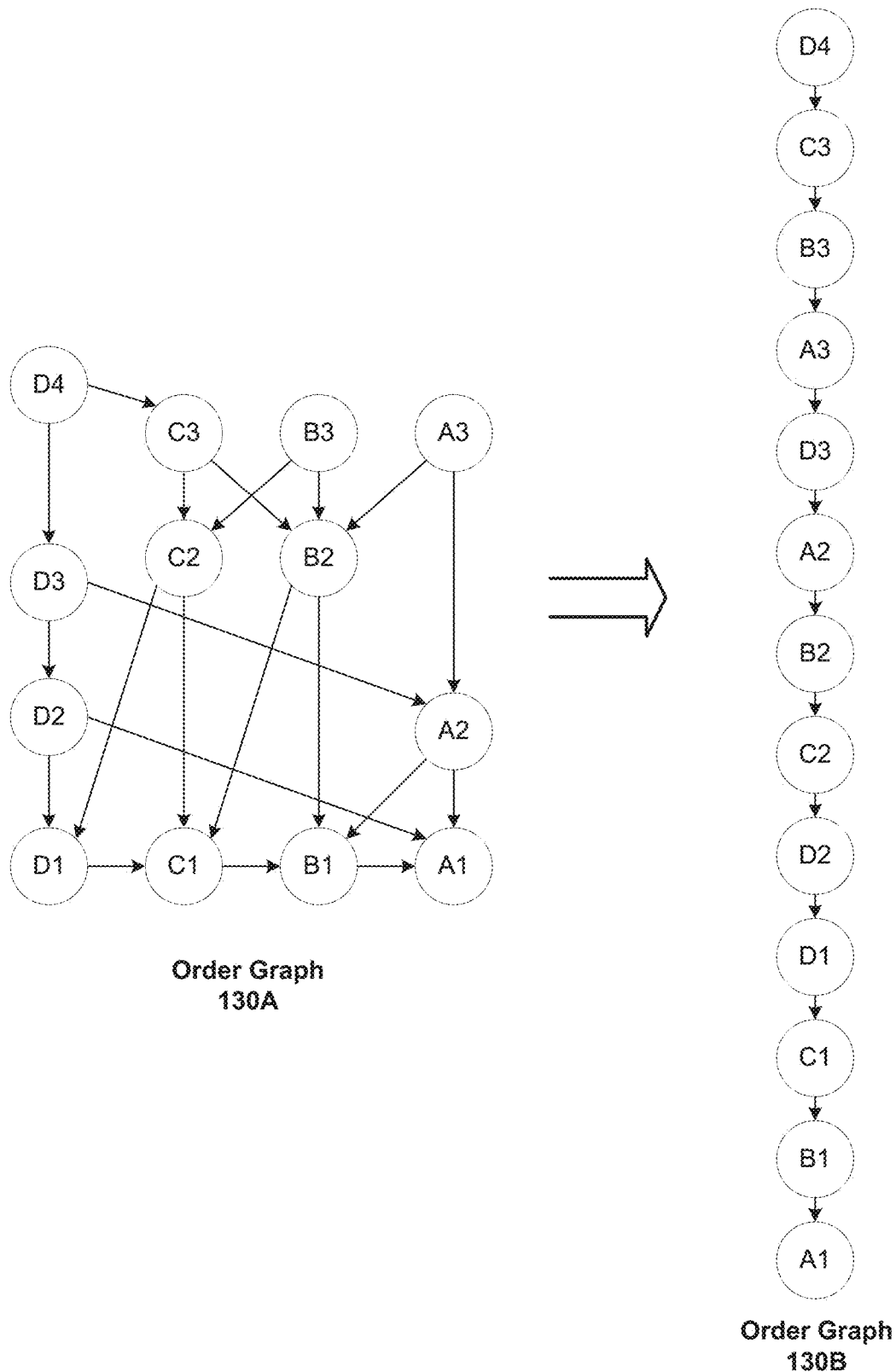
FIG. 1D is a diagram illustrating a process of converting the order graph into a linear graph according to example embodiments.

The process of extracting a total order from a gossip DAG is similar to pulling a single thread out of a randomly woven ribbon where the ribbon is the gossip DAG, and the thread is the consensus total order in the order graph 130B as shown in FIG. 1D. As further described below with respect to FIGS. 4A-4E, a number of transforms are performed on the order graph creating an "untangling pipeline" in which the blocks and edges of the gossip DAG go in one end when created, and the total order comes out the other.

The form this pipeline takes is that of the second, derivative graph, called the order graph, consisting of nodes (not blocks) that serve as proxies for the blocks in the gossip DAG. One "end" of the order graph tracks the extensions of the gossip DAG by creating a new node, and appropriate edges, for each new block added to the gossip DAG. The other "end" of the order graph is a linear sequence of the nodes placed in consensus total order consistent with the temporal relationships in the gossip DAG. In between, the order graph is subject to systematic, temporal relationship preserving, transformations that make implicit relations explicit, exploit arbitrary relationships, and remove redundancy.

In practice, the consensus total order would not be retained as a complete list as illustrated emerging intact from the order graph 130B. Instead, when a node is placed into the total order, the position of the corresponding block in the gossip DAG has been determined, so there is no further need for the corresponding order graph node. Thus, it can be discarded. Accordingly, in practice, the order graph will only contain a small number of nodes relative to the number of blocks in the DAG, as it removes nodes once they are placed in the consensus total order.

The gossip protocol may occur between peers in what is essentially a "permissioned blockchain." The gossip DAG may be thought of as a parallel set of blockchains, one for each peer, that have (random) interconnections between them. Each of these parallel blockchains is extended exclusively by one of each of the peers, though each peer has a copy of all of the parallel blockchains (which is what makes up the gossip DAG). A block is created by a peer on its exclusive change when another peer makes a (random) connection to it. When that happens, the peer selects a set of transactions that the peer has cached and creates the block, putting into the block's header two hash values, one for the block that proceeds this block in the peer's exclusive blockchain (that hash value effectively chains the blocks together), and one that was sent to it from the peer that (randomly) contacted it. That hash value is that of the block that is the most recent in the originating peer's exclusive blockchain. Thus, a peer may not be able to create a block until another peer contacts the peer.

The process may be "boot strapped" by designating one of the peers as the "starting peer" which means that it creates a very first block (the genesis block) on its own without being contacted, and then it randomly selects one of the other peers and contacts the other peer, providing the hash value of the genesis block in the process. The other peer may create a block and add any transactions to the block as appropriate (including none at all), and store a null hash value for the previous block in its exclusive blockchain (because there isn't one) and the hash value of the genesis block that was received. At this point both peers can repeat the process, however the peers that do not yet have a block in their exclusive blockchain may wait to be contacted as they are not able to provide a hash value to some other peer they might contact until they have created their first block.

Whenever two peers contact each other they also exchange as much of the gossip DAG as is needed so that both have the same set of blocks. It is in this way that the gossip DAG propagates amongst the peers. It should be clear that each peer has its own evolving copy of the gossip DAG, and its own evolving copy of the order graph. It may not be obvious, but it would be expected that each peer would have a slightly incomplete version of the gossip DAG at any one time, as the DAG is constantly being extended in parallel with the addition of new blocks that are not instantly propagated to all peers.

Figure 2:
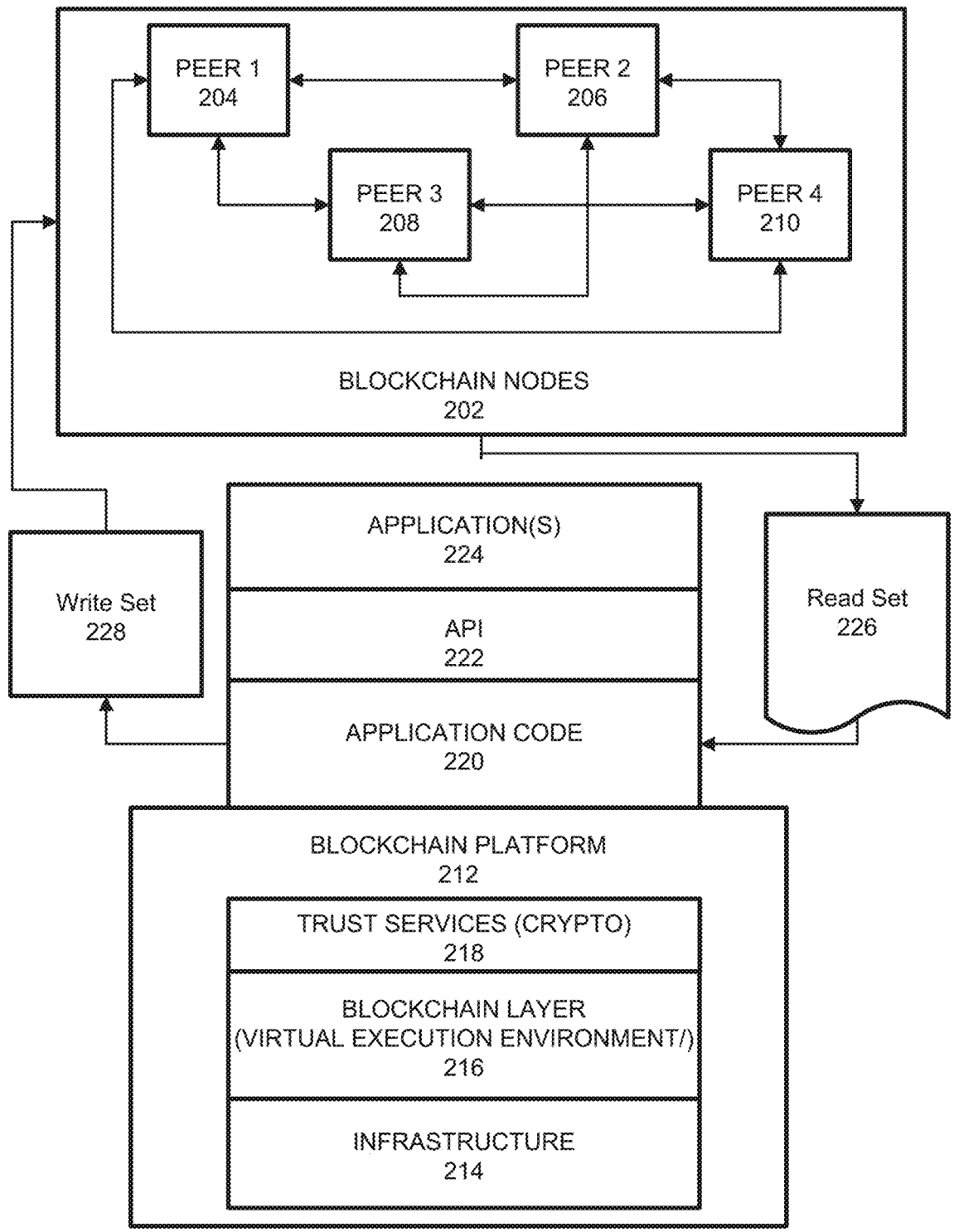
FIG. 2 is a diagram illustrating an example blockchain architecture configuration, according to example embodiments.

FIG. 2 illustrates a blockchain architecture configuration 200, according to example embodiments. Referring to FIG. 2, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2 may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, a read set 226 may be processed by one or more processing entities (e.g., virtual machines) included in the blockchain layer 216. A write set 228 may include a result of processing the read set 226 via one or more smart contracts. The physical infrastructure 214 may be utilized to retrieve any of the data or information described herein.

A smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 3A:
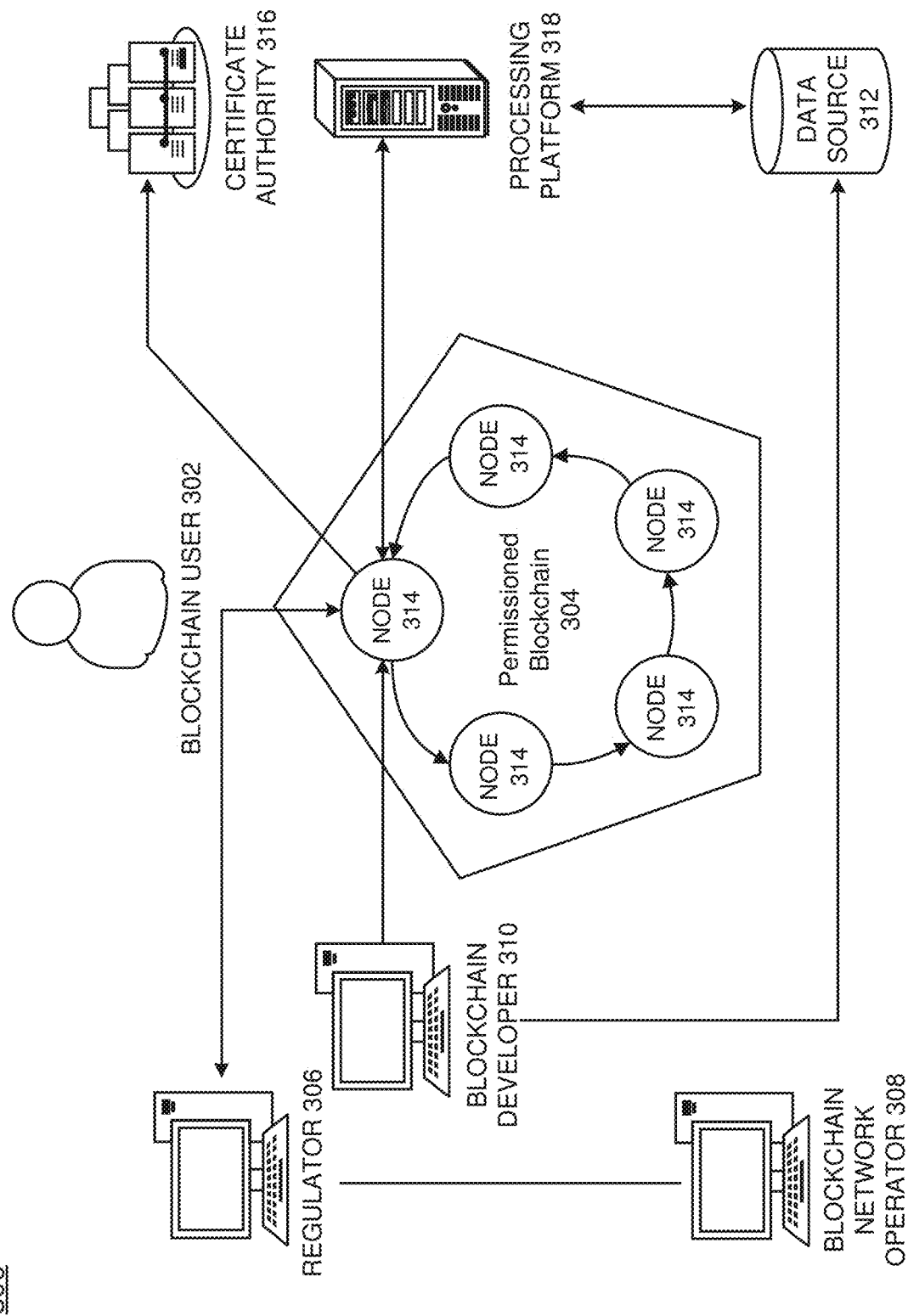
FIG. 3A is a diagram illustrating a permissioned network, according to example embodiments.

FIG. 3A illustrates an example of a permissioned blockchain network 300, which features a distributed, decentralized peer-to-peer architecture. In this example, a blockchain user 302 may initiate a transaction to the permissioned blockchain 304. In this example, the transaction can be a deploy, invoke, or query, and may be issued through a client-side application leveraging an SDK, directly through an API, etc. Networks may provide access to a regulator 306, such as an auditor. A blockchain network operator 308 manages member permissions, such as enrolling the regulator 306 as an "auditor" and the blockchain user 302 as a "client". An auditor could be restricted only to querying the ledger whereas a client could be authorized to deploy, invoke, and query certain types of chaincode.

A blockchain developer 310 can write chaincode and client-side applications. The blockchain developer 310 can deploy chaincode directly to the network through an interface. To include credentials from a traditional data source 312 in chaincode, the developer 310 could use an out-of-band connection to access the data. In this example, the blockchain user 302 connects to the permissioned blockchain 304 through a peer node 314. Before proceeding with any transactions, the peer node 314 retrieves the user's enrollment and transaction certificates from a certificate authority 316, which manages user roles and permissions. In some cases, blockchain users must possess these digital certificates in order to transact on the permissioned blockchain 304. Meanwhile, a user attempting to utilize chaincode may be required to verify their credentials on the traditional data source 312. To confirm the user's authorization, chaincode can use an out-of-band connection to this data through a traditional processing platform 318.

Figure 3B:
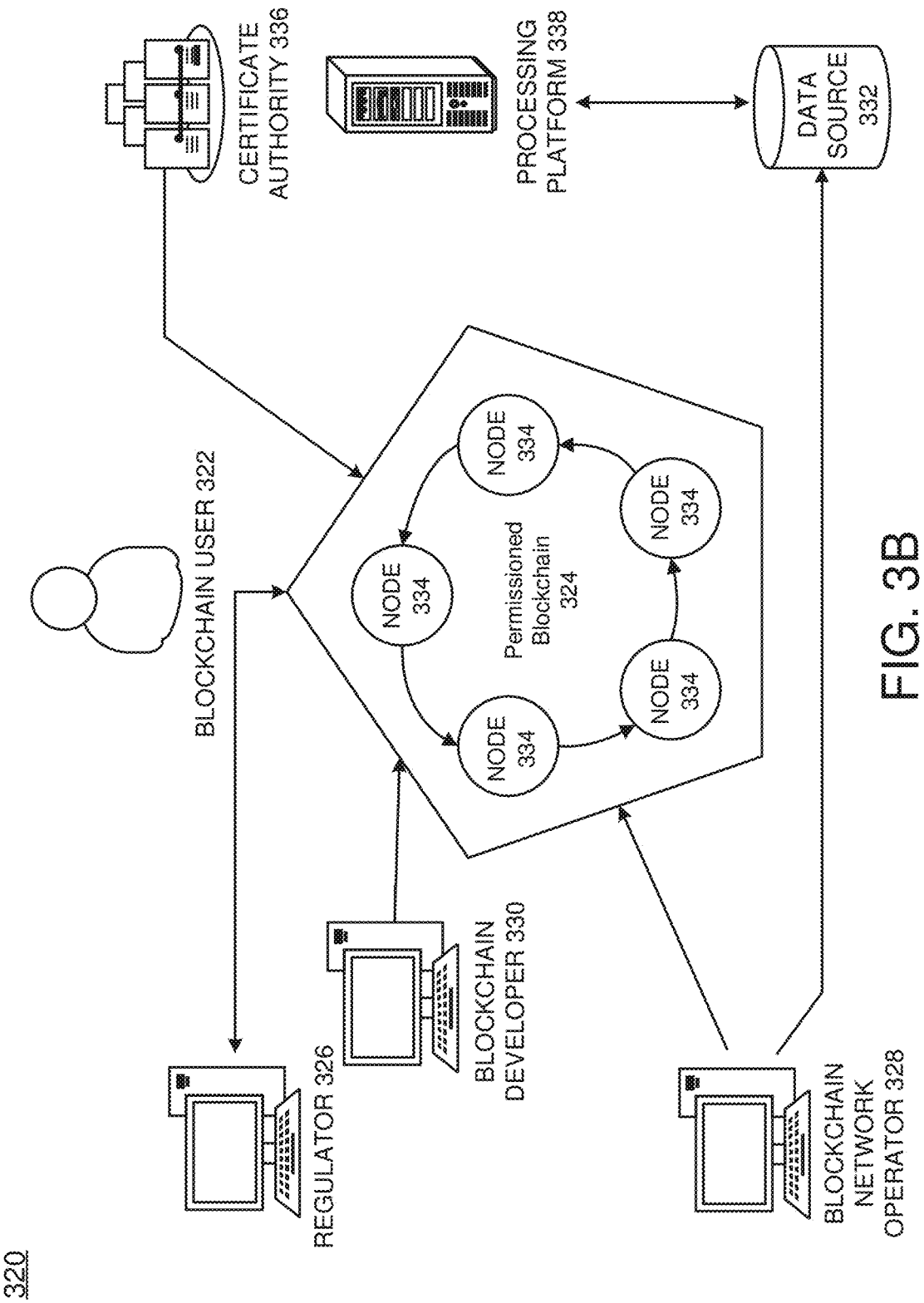
FIG. 3B is a diagram illustrating another permissioned network, according to example embodiments.

FIG. 3B illustrates another example of a permissioned blockchain network 320, which features a distributed, decentralized peer-to-peer architecture. In this example, a blockchain user 322 may submit a transaction to the permissioned blockchain 324. In this example, the transaction can be a deploy, invoke, or query, and may be issued through a client-side application leveraging an SDK, directly through an API, etc. Networks may provide access to a regulator 326, such as an auditor. A blockchain network operator 328 manages member permissions, such as enrolling the regulator 326 as an "auditor" and the blockchain user 322 as a "client". An auditor could be restricted only to querying the ledger whereas a client could be authorized to deploy, invoke, and query certain types of chaincode.

A blockchain developer 330 writes chaincode and client-side applications. The blockchain developer 330 can deploy chaincode directly to the network through an interface. To include credentials from a traditional data source 332 in chaincode, the developer 330 could use an out-of-band connection to access the data. In this example, the blockchain user 322 connects to the network through a peer node 334. Before proceeding with any transactions, the peer node 334 retrieves the user's enrollment and transaction certificates from the certificate authority 336. In some cases, blockchain users must possess these digital certificates in order to transact on the permissioned blockchain 324. Meanwhile, a user attempting to utilize chaincode may be required to verify their credentials on the traditional data source 332. To confirm the user's authorization, chaincode can use an out-of-band connection to this data through a traditional processing platform 338.

In some embodiments, the blockchain herein may be a permissionless blockchain. In contrast with permissioned blockchains which require permission to join, anyone can join a permissionless blockchain. For example, to join a permissionless blockchain a user may create a personal address and begin interacting with the network, by submitting transactions, and hence adding entries to the ledger. Additionally, all parties have the choice of running a node on the system and employing the mining protocols to help verify transactions.

Figure 3C:
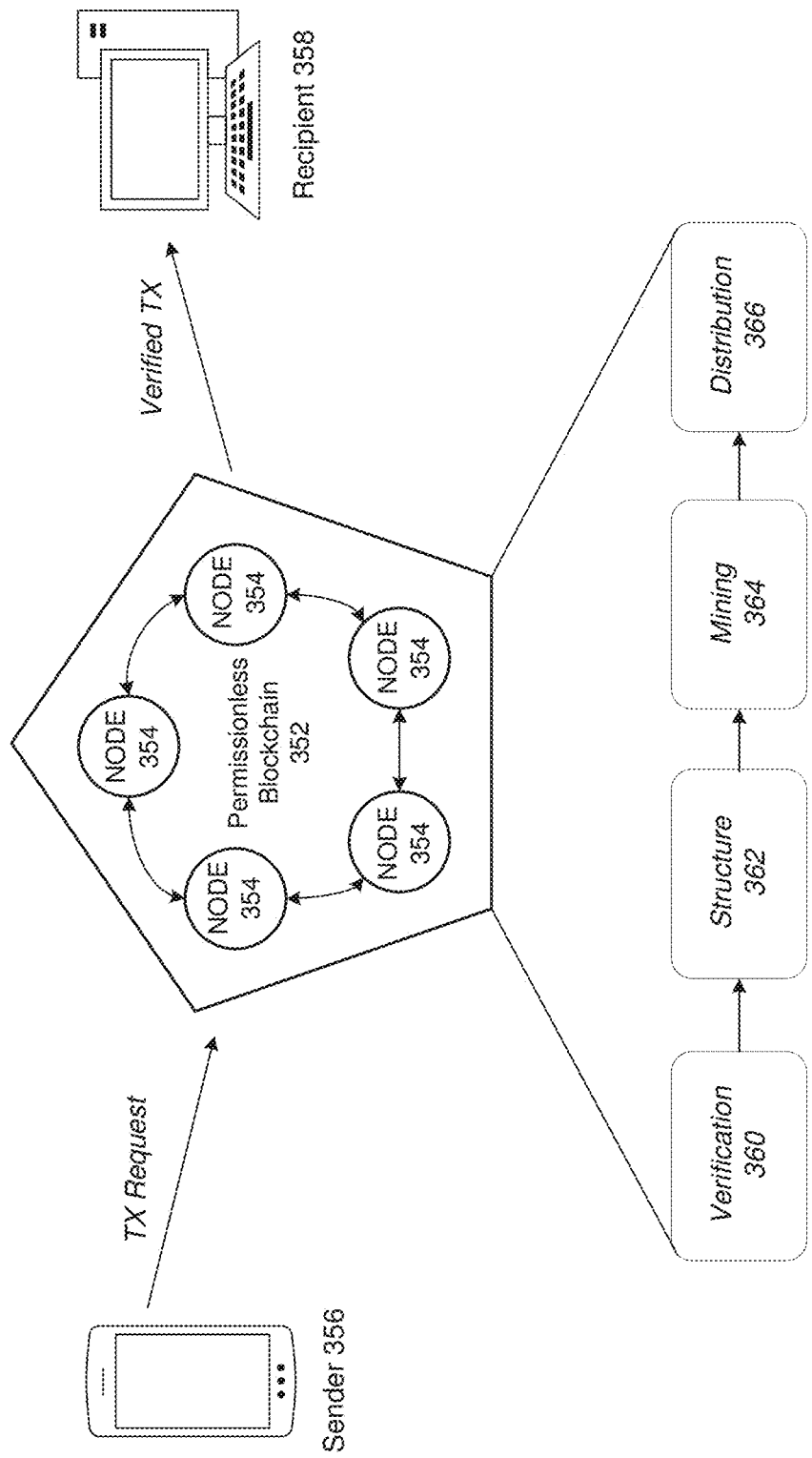
FIG. 3C is a diagram illustrating a permissionless network, according to example embodiments.

FIG. 3C illustrates a process 350 of a transaction being processed by a permissionless blockchain 352 including a plurality of nodes 354. A sender 356 desires to send payment or some other form of value (e.g., a deed, medical records, a contract, a good, a service, or any other asset that can be encapsulated in a digital record) to a recipient 358 via the permissionless blockchain 352. In one embodiment, each of the sender device 356 and the recipient device 358 may have digital wallets (associated with the blockchain 352) that provide user interface controls and a display of transaction parameters. In response, the transaction is broadcast throughout the blockchain 352 to the nodes 354. Depending on the blockchain's 352 network parameters the nodes verify 360 the transaction based on rules (which may be pre-defined or dynamically allocated) established by the permissionless blockchain 352 creators. For example, this may include verifying identities of the parties involved, etc. The transaction may be verified immediately or it may be placed in a queue with other transactions and the nodes 354 determine if the transactions are valid based on a set of network rules.

In structure 362, valid transactions are formed into a block and sealed with a lock (hash). This process may be performed by mining nodes among the nodes 354. Mining nodes may utilize additional software specifically for mining and creating blocks for the permissionless blockchain 352. Each block may be identified by a hash (e.g., 256 bit number, etc.) created using an algorithm agreed upon by the network. Each block may include a header, a pointer or reference to a hash of a previous block's header in the chain, and a group of valid transactions. The reference to the previous block's hash is associated with the creation of the secure independent chain of blocks.

Before blocks can be added to the blockchain, the blocks must be validated. Validation for the permissionless blockchain 352 may include a proof-of-work (PoW) which is a solution to a puzzle derived from the block's header. Although not shown in the example of FIG. 3C, another process for validating a block is proof-of-stake. Unlike the proof-of-work, where the algorithm rewards miners who solve mathematical problems, with the proof of stake, a creator of a new block is chosen in a deterministic way, depending on its wealth, also defined as "stake." Then, a similar proof is performed by the selected/chosen node.

With mining 364, nodes try to solve the block by making incremental changes to one variable until the solution satisfies a network-wide target. This creates the PoW thereby ensuring correct answers. In other words, a potential solution must prove that computing resources were drained in solving the problem. In some types of permissionless blockchains, miners may be rewarded with value (e.g., coins, etc.) for correctly mining a block.

Here, the PoW process, alongside the chaining of blocks, makes modifications of the blockchain extremely difficult, as an attacker must modify all subsequent blocks in order for the modifications of one block to be accepted. Furthermore, as new blocks are mined, the difficulty of modifying a block increases, and the number of subsequent blocks increases. With distribution 366, the successfully validated block is distributed through the permissionless blockchain 352 and all nodes 354 add the block to a majority chain which is the permissionless blockchain's 352 auditable ledger. Furthermore, the value in the transaction submitted by the sender 356 is deposited or otherwise transferred to the digital wallet of the recipient device 358.

Figure 4A:
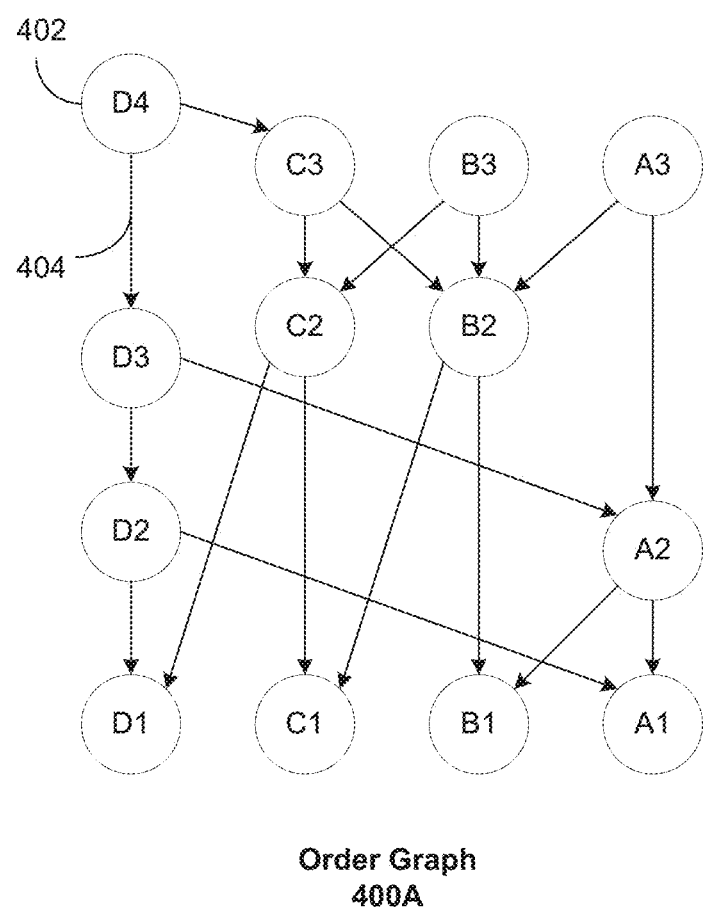
FIG. 4A is a diagram illustrating an order graph with nodes and edges representing blocks in a DAG blockchain according to example embodiments.

FIG. 4A illustrates an order graph 400A which corresponds to the order graph 130A shown in FIG. 1C and FIG. 1D. The transformations described with respect to FIGS. 4B-4E illustrate how the order graph 400A shown in FIG. 4A becomes the order graph 400E with a sequential linear order as shown in FIG. 4E. The transformations are based on the structure of the order graph 400A including nodes 402 and edges 404 representing blocks in a DAG blockchain and hash links between the blocks, respectively.

The order graph may be modified through the application of three, relative temporal order preserving, transformations including a parent transform, a cycle transform, and a path transform. The parent transform is responsible for making implicit relationships explicit. The cycle transform is responsible for removing arbitrary order relationships induced by the gossip protocol (e.g., identify which block is to be positioned first when two peers contact each other simultaneously, and two blocks are created, etc.). Like the cycle transform, the path transform is responsible for removing arbitrary temporal relationships resulting from unrelated, but parallel, paths in the graph. The path transform is also responsible for removing redundant edges by identifying and removing multiple paths between nodes.

Figure 4B:
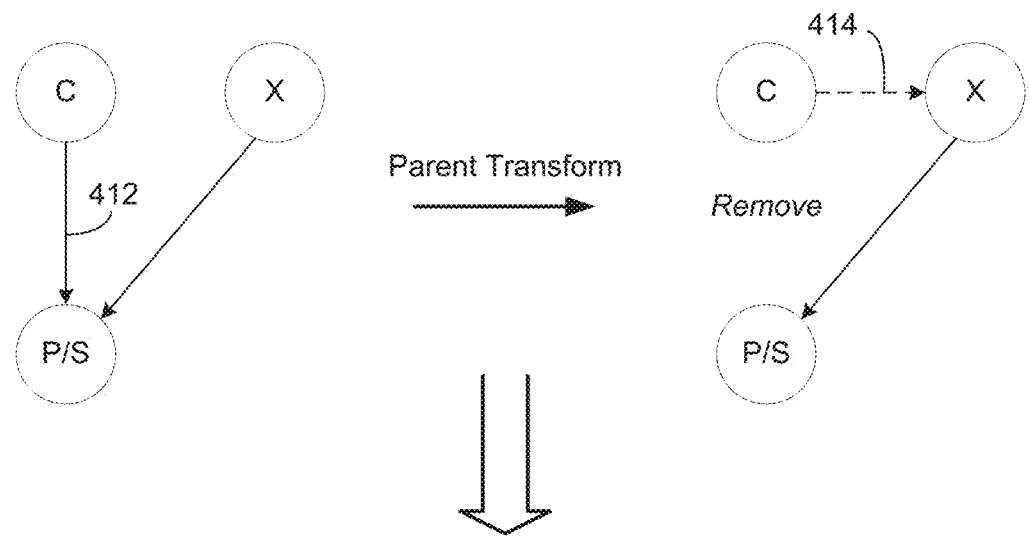
FIG. 4B is a diagram illustrating a process of performing a parent transform on nodes in the order graph according to example embodiments.
Figure 4B:
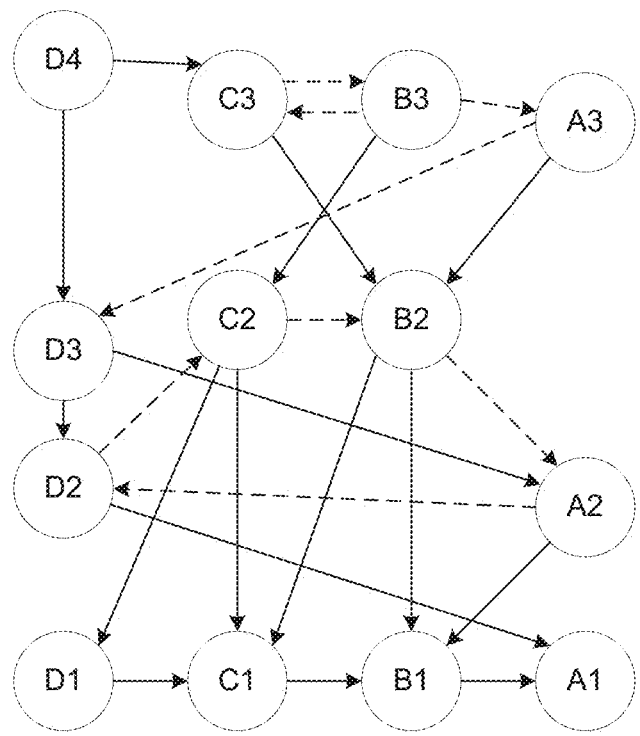

FIG. 4B illustrates a process 410 of performing a parent transform on nodes in the order graph 400A to create modified order graph 400B, according to example embodiments. In the gossip DAG, the relationships between blocks created as a result of the gossip protocol are represented explicitly. For example, a block created to record a gossip connection to a peer has an edge to its parent block (the one created for the previous connection to this peer), and an edge to its source block (owned by the initiating peer). Referring to FIGS. 4A and 4B, a block can serve as both a parent and a source block. For example, block B2 in the order graph 400A is a parent to block B3, and a source for blocks C3 and A3. In this case, the parent block B2 is (obviously) older than the other nodes that reference it. There is, however, a temporal relationship not represented in the gossip DAG between the child block (B3) and each of the blocks (C3 and A3) that have the child block's parent block (B2) as their source block.

A block that is a source block can be the source block for many separate gossip connections, not just one. However, it only becomes a parent block when another peer initiates a connection to the parent block's peer. The connection results in the creation of the parent's child block. When the child block is created, the parent block will no long be a source node for any future connections, being replaced in that role by the child block just created. This means that all child blocks are implicitly created after the blocks that use the parent block as a source block (i.e., block B3 is created after blocks C3 and A3).

The parent transform shown in FIG. 4B modifies the order graph to make this implicit temporal relationship explicit.

Here, the parent transform may add an edge 414 from each child node to each other node that references the child node's parent node as its source node. To avoid introducing redundancy, the parent transform also modifies the order graph by removing the edge 412 from the child node to its parent node as their temporal relationship (child comes after parent) is still (implicitly) represented transitively in the order graph by the path from the child, through any new edges to the node that uses the parent as its source, and then to the parent node. FIG. 4B illustrates the parent transform in which child node C has a relationship with parent node P, and in which node X has a relationship with parent node P (P is its source node). The parent transform removes the edge 412 from node C to node P, and replaces it with an edge 414 from C to node X.

Furthermore, the results of applying the parent transform to the original order graph 400A shown in FIG. 4A, are shown in modified order graph 400B shown in FIG. 4B. Here, newly added horizontal edges are represented with dashed lines, while removed edges between parent-child node pairs are removed such as between D2-D1, C3-C2, B3-B2, A3-A2, and A2-A1. In making the changes to the original order graph 400A, the parent transform has created/exposed a cycle (i.e., a loop) between nodes C3 and B3. In addition, less obvious in the tangle of edges is another cycle created by the parent transform linking nodes D2, C2, B2, and A2.

Figure 4C:
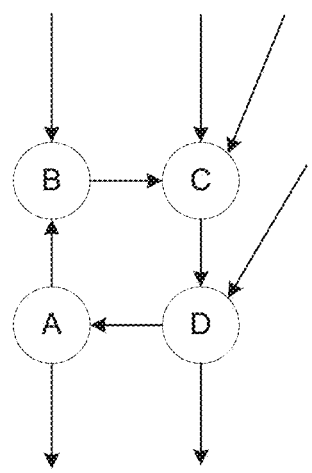
FIG. 4C is a diagram illustrating a process of performing a cycle transform on nodes in the order graph according to example embodiments.
Figure 4C:
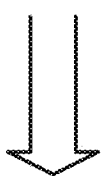
Figure 4C:
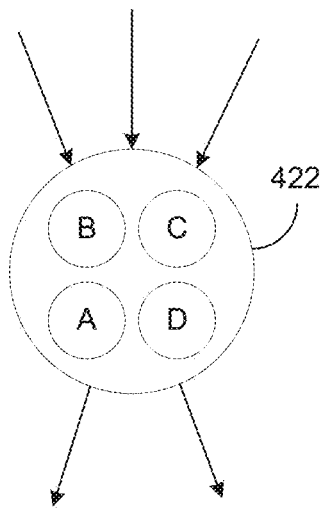
Figure 4C:
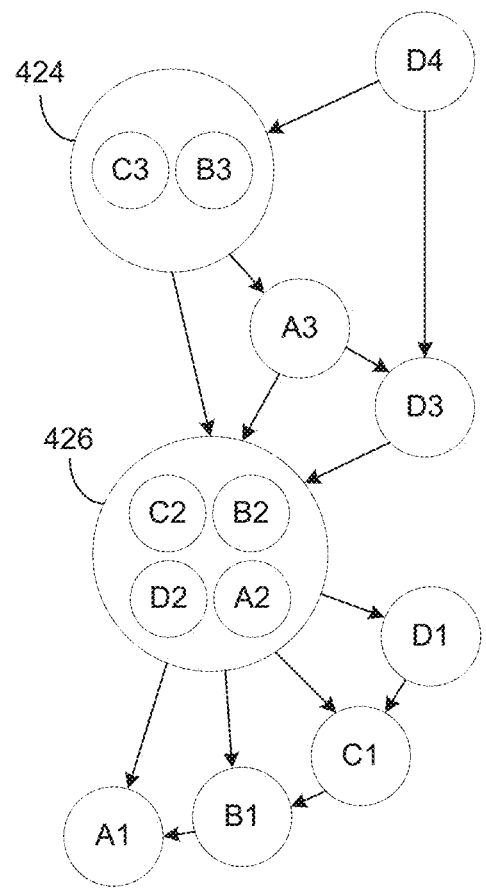
Figure 4E:
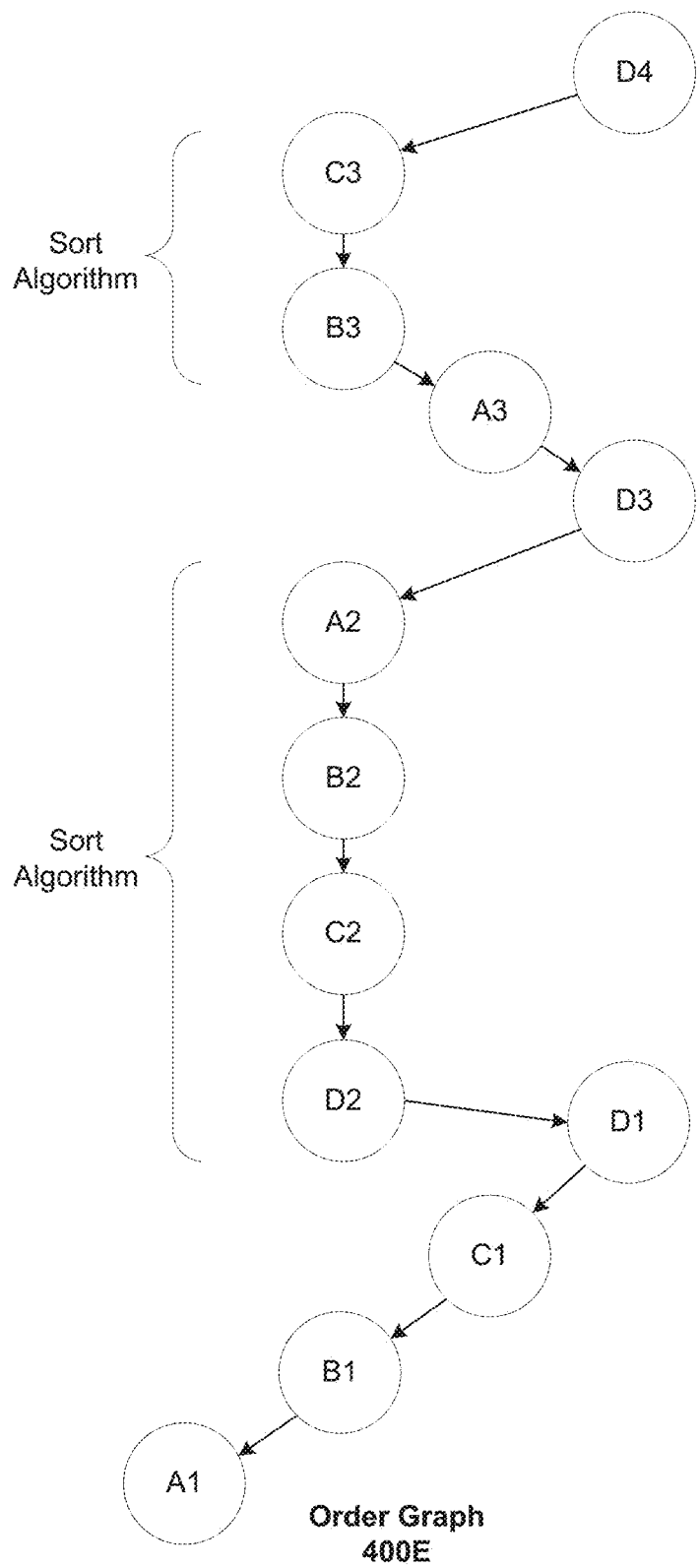
FIG. 4E is a diagram illustrating the order graph with a linear sequential order according to example embodiments.

FIG. 4C illustrates a process 420 of performing a cycle transform on nodes in the order graph 400B to create modified order graph 400C, according to example embodiments. A gossip DAG, being a directed acyclic graph, does not naturally contain any cycles, and the creation of new nodes and edges in the order graph, to match the extension of the gossip DAG, does not directly introduce cycles into the order graph either. However, the order graph can have cycles that are created as part of the transformation process. Cycles in the order graph result from the application of the previously described parent transform that makes implicit temporal relationships into explicit ones. The intuition behind the formation of cycles is that they capture the parallel creation of blocks in the DAG caused by peers making simultaneous connections. The application of the parent transform creates new edges between nodes in the order graph that have the same relative relationship with a parent/source node, thus exposing cyclic temporal dependencies.

Referring to FIG. 4C, a cycle consists of a set of nodes whose relative order is arbitrary, and results when two peers simultaneously initiate gossip connections with each other (i.e., A→B & B→A), or when more than two peers initiate gossip connections in a "circular" manner, an example of the latter scenario with a cycle of four nodes, A→B→C→D→A, is illustrated in FIG. 4C. The nodes in a cycle in the order graph are essentially temporally equal meaning that with respect to each other, their order is arbitrary. The cycle transform handles this situation by aggregating the nodes in the cycle such that they are "removed" from the order graph, and replaced with a single cycle node 422. Any edge in the order graph to any one of the nodes in the cycle is now changed to reference the new cycle node 422.

The new cycle node 422 maintains references to the nodes that form the cycle so they are available later when the position of the cycle node is determined in the total order, at which point the nodes in the cycle are deterministically placed in relative order with respect to each other, and then, in that order, take the place of the cycle node in the total order. An example of this is illustrated FIG. 4C where nodes C3 and B3 are converted into a cycle node 424 and nodes D2, C2, B2, and A2, are converted into a cycle node 426, to create a modified order graph 400C. Before finally resolving the order of the nodes encapsulated by these cycle nodes 424 and 426, the peer can perform additional transforms until redundant paths to the cycle nodes 424 and 426 are removed. At which point, the nodes encapsulated by the cycle nodes 424 and 426 can be placed into relative order as further described with respect to FIG. 4E, and then inserted into the consensus total order.

FIG. 4D illustrates a process 430 of performing a path transform on nodes in the order graph 400C to create the modified order graph 400D, according to example embodiments. The path transform is responsible for removing both redundant and arbitrary temporal relationships from the order graph. The redundant temporal relationships are those that explicitly specify a temporal order between two nodes X and Z (i.e., by having an edge from X to Z), that is also represented transitively by a longer path existing in the order graph between nodes X and Z (the longer path is retained because it contains the most temporal relationship information). The arbitrary temporal relationships are represented by parallel paths between nodes that result from the randomness of the connections made by the gossiping peers. In the example of FIG. 4D, there are two redundant paths between nodes X and Z. In particular, there is a path through edger 431, and a second path through edges 432, 433, and node Y.

In this example, the edge 431 from node X to node Z indicates that node X is temporally after node Z. Similarly, the edge 433 from node Y to node Z indicates that node Y is also temporally after node Z, while the edge 432 from node X to node Y indicates that node X is temporally after node Y. The edge 431 from node X to node Z can be removed without losing the information that X is temporally after Z (i.e., X→Y→Z). This transformation should look familiar as it is basically the half of the parent transform that removes the redundant edge between a parent and child node, where the other half adds the edge between the child and the node that references the parent as its source node. The Parent Transform could be "simplified" by having it leave the child to parent edge intact for the path transform to remove later, but it is an obvious optimization to simply remove it rather than reprocessing the order graph with the path transform to rediscover the redundancy.

In the process 430 of FIG. 4D, the path transform can be applied to remove all redundant paths shown in the order graph 400C to create the modified order graph 400D. In particular, after the cycle transform, the order graph 400C had quite a few redundant relationships that the path transform removes directly. For instance, the edge from the cycle node 426→A1 is redundant because of the path cycle node 426→B1→A1 and therefore can be removed. At the same time, the cycle node 426→B1 is also redundant because of the path of the cycle node 426→C1→B1, and therefore it can be removed. It doesn't stop there, because the edge between the cycle node 426→C1 is redundant as well because of the path of cycle node 426→D1→C1, and it can be removed as well. This leaves the single edge from the cycle node 426→D1 which is not redundant, and preserves the path cycle node 426→D1→C1→B1→A1, which embodies all of the temporal relationships between those nodes. Similar transforms can be performed to the cycle node 424 and other redundant paths resulting in the modified order graph 400D.

The result of the order graph 400D is the linear sequence of nodes starting at node D4 and continuing through to node A1, that is almost the consensus total order. The only remaining step is to resolve the order of the nodes in the two cycle nodes 424 and 426. For example, since all of the nodes D2, C2, B2, and A2 in cycle node 426 come after node D1 and before node D3, the system can arbitrarily put them into relative checksum numeric order (smallest first) and put the nodes back in place of the cycle node 426. The same can be performed for the nodes C3 and B3 in the cycle node 424. The result is shown in FIG. 4E resulting in a modified order graph 400E with represents the total consensus order.

The algorithm to arbitrarily order nodes in a cycle may be specified, by default, to simply "sort" the blocks by their hash values. This is both arbitrary, difficult to manipulate and reproducible by the different peers to produce exactly the same result, but other techniques could be used. In some embodiments, the algorithm to be used may be selected at configuration time before the execution any peer (and all peers would have the same configuration). One way to do this is to use a programming framework that supports "dependency injection." The idea is that when the code begins execution a bit of initialization code from the framework is executed that examines the current configuration and then creates an instance of the selected algorithm. It then uses special techniques to modify the code that would use the algorithm so that it gets a reference to the one selected by the configuration and created by the framework. This is referred to as dependency injection because the "dependency" (the algorithm) is "injected" into the code that uses it. It is an extremely flexible and powerful technique.

Although not shown in FIGS. 4A-4E, in some cases, the gossip protocol can create independent parallel temporal dependencies, meaning that there can be sequences of blocks in the gossip DAG that do not have any relationships between their collection of blocks, and, thus, the order of the sequences is arbitrary. This is basically an expanded version of the simultaneous parallel gossip connections scenario that ultimately results in cycles in the order graph, except in this case, it results in independent parallel paths in the order graph.

Parallel paths in the order graph represent redundancy and need to be resolved to determine the final consensus total order. Parallel paths can also represent temporal equivalence, meaning the creation of blocks in the Gossip DAG at essentially the "same time." The blocks on two different parallel paths have no edges between them so there is no way to directly relate them for relative positions the consensus total order, and so they have to be considered to be temporally equivalent. This is the same situation as for blocks in a cycle where it is impossible to select the one block that came first.

One way to process parallel paths is to proactively detect them in the order graph (i.e., search for them), and then either remove a single edge representing the shortest path, for the simplest cases, or extract the nodes/paths and replace them with a single aggregating node like is done for cycles. However, this can consume significant processing cycles to traverse the different paths that can exist in an order graph looking for ones that happen to be parallel, and, resolution can become complicated when there are parallel paths of parallel paths. Another, and more efficient, approach is to let parallel paths remain in the order graph until they work their way "forward" to the point where blocks are being emitted from the graph in consensus total order. It is at that point that it becomes simplistically evident which blocks are temporally equivalent due to the nature of their parallel paths, and which are not. The blocks that are at the same (indeterminate) temporal position can be extracted and replaced by a single aggregate block (as is done for cycles). When that aggregate block is emitted from the order graph, the blocks it represents are placed into the consensus total order in the same manner as aggregated cycle blocks.

The process of emitting a block from the order graph as the next one in the consensus total order starts with having a designated consensus candidate which is the single block in the order graph that only has edges coming into it, meaning all other blocks come after it in the consensus temporal order. A block can be emitted from the order graph when there is just a single block in the order graph that has an edge to it. The block will then become the new consensus candidate. In the case of parallel paths in the order graph, there will be consensus candidates that will have multiple incoming edges. At this point, parallel paths can be resolved.

Resolution can be achieved by acting on a simple observation. For example, blocks that have edges to the consensus candidate can be partitioned into two groups, those that only have one single edge (the one to the consensus candidate), and those that have more than one. The blocks that have edges to more than one block, also have more than one path to the consensus candidate block (by following those other edges). Of those edges, the edge that is directly incident on the consensus candidate must be the shortest one (length 1), so, it is redundant (longer paths are favored), and it can be removed from the order graph. The blocks in the former group, the ones with a only a single edge which is incident on the consensus candidate, are the ones that are temporally equivalent. These blocks can be extracted from the order graph, and aggregated in the same manner employed for blocks in cycles.

When the extraction and replacement is completed, and all of the edges in the order graph are updated to reflect the changes, the consensus candidate block will now be followed by just a single block, the new aggregating block, and can now be emitted from the graph. When this happens, the new aggregate block will then become the new consensus candidate block, and the process will repeat.

Figure 5:
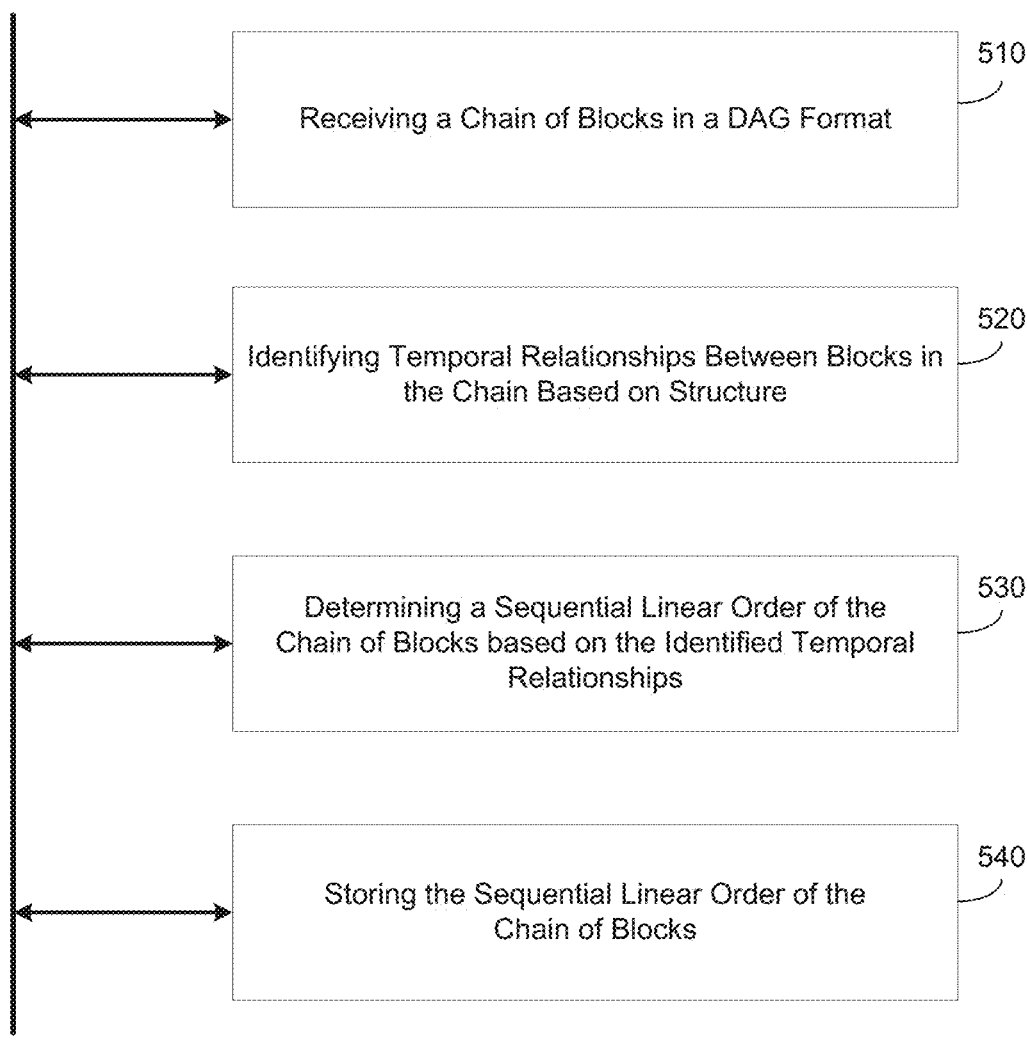
FIG. 5 is a diagram illustrating a method of determining a consensus order from a blockchain in DAG format according to example embodiments.

FIG. 5 illustrates a method 500 of determining a consensus order from a blockchain in a DAG format according to example embodiments. Referring to FIG. 5, in 510 the method may include receiving a chain of blocks from a blockchain comprising a directed acyclic graph (DAG) format in which blocks are independently hash-linked to multiple blocks. Each block may be linked to a parent block. In addition, blocks may also be linked to other non-parent blocks in the blockchain with the DAG format. Here, the block may include a hash value of the parent block and a hash value of the other block thereby linking the block independently to multiple other blocks in the chain. In order to manipulate an order of the blocks, the system may convert the blocks arranged in the DAG format into a corresponding graph of nodes in the DAG format where the nodes are connected with edges to represent linked relationships between the corresponding blocks. In some embodiments, the chain of blocks in the DAG format may include a plurality of subsets of linear chains of blocks of a plurality of peers, where the plurality of subsets of linear chains of blocks comprise interconnections therebetween.

In 520, the method may include identifying temporal relationships between blocks in the chain of blocks based on a structure of the chain of blocks in the DAG format. For example, the temporal relationships may be determined based on structural transformations within the graph of nodes based on implicit relationships between the nodes.

The implicit relationships may be detected from the structure of the nodes themselves, rather than rely on less consistent and easily faked timestamps. The DAG graph of nodes may be transformed into a linear graph of nodes based on various transforms including a parent transform, a cycle transform, and a path transform.

In some embodiments, the identifying may include cloning the chain of blocks or otherwise converting the chain of blocks into a chain of nodes on a graph in the DAG format where the nodes have edges therebetween representing the hash links between the blocks. In this example, the identifying of the temporal relationships may include identifying the temporal relationships based on a structure of the edges between the nodes on the graph. In some embodiments, the identifying may include transforming a parent relationship on the graph via addition of an edge from a child node to a node that is linked to a parent node of the child node, and removal an edge between the child node and the parent node.

In some embodiments, the identifying may include transforming cyclical nodes (which have edges creating a complete loop) on the graph via aggregation of nodes having a same relative temporal relationship into a single cycle node which encompasses the aggregated nodes. In some embodiments, the transforming the cycle nodes may include creating an order among the aggregated nodes encompassed in the single cycle node based on a predefined protocol. In some embodiments, the identifying may include identifying two different paths between a pair of nodes on the graph, and removing a shorter path between the pair of nodes among the two different paths.

In 530, the method may include determining a sequential linear order of the chain of blocks in the DAG format based on the identified temporal relationships, and in 540, the method may include storing the sequential linear order of the chain of blocks. Accordingly, the method may untangle the DAG format into a linear format as in a traditional sequence of blocks on a blockchain. In some embodiments, the method may further include performing a blockchain consensus process with a plurality of peer nodes based on the sequential linear order of the chain of blocks. For example, a blockchain node performing the method 500 may perform a consensus process and provide the linear order of the chain of blocks to verify that the blockchain node is part of the blockchain and its ledger has integrity.

Figure 6A:
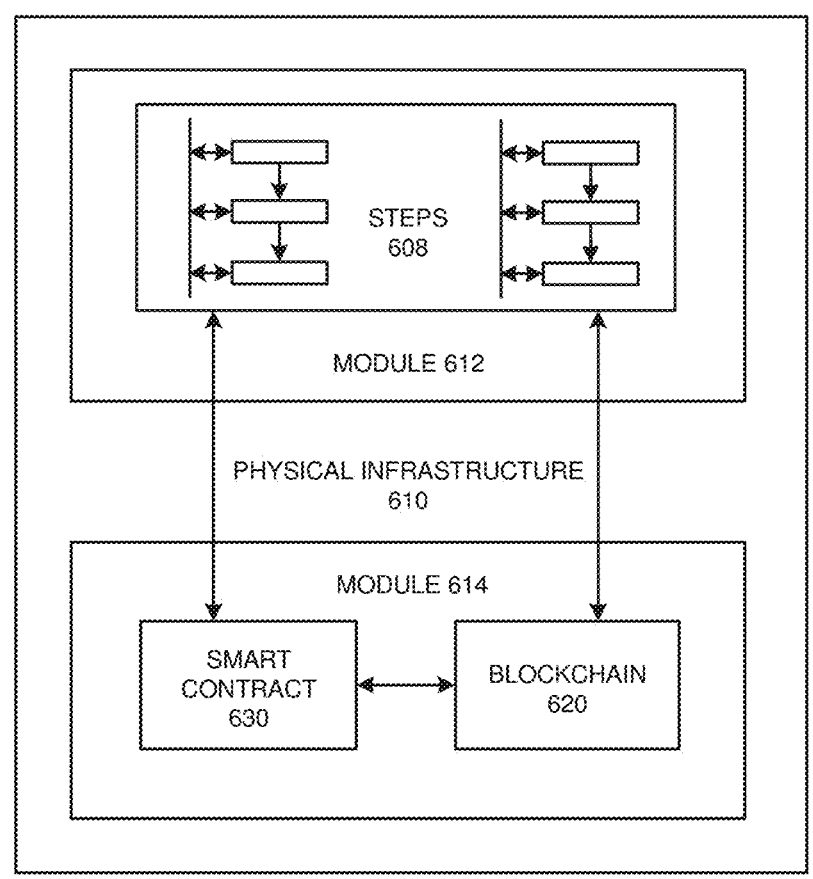
FIG. 6A is a diagram illustrating an example system configured to perform one or more operations described herein, according to example embodiments.

FIG. 6A illustrates an example system 600 that includes a physical infrastructure 610 configured to perform various operations according to example embodiments. Referring to FIG. 6A, the physical infrastructure 610 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6B:
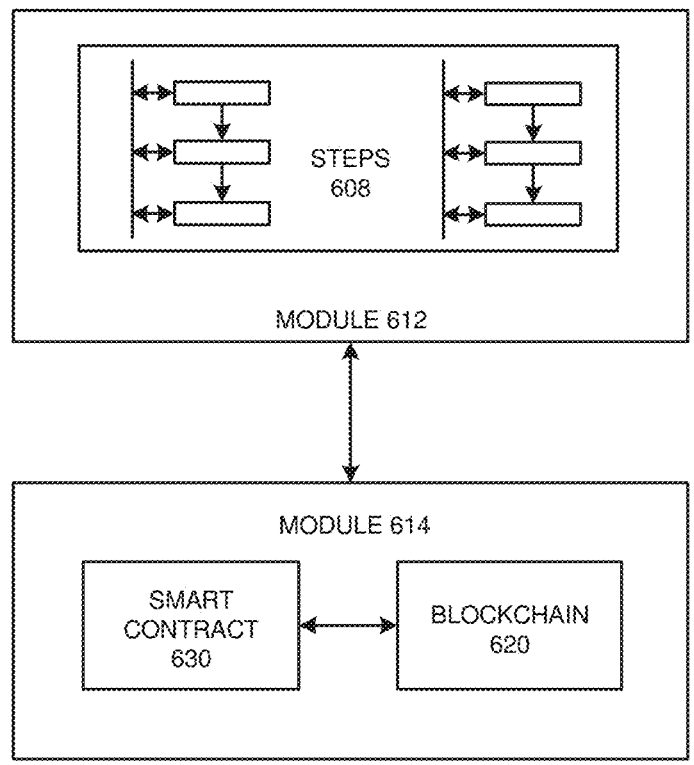
FIG. 6B is a diagram illustrating another example system configured to perform one or more operations described herein, according to example embodiments.

FIG. 6B illustrates another example system 640 configured to perform various operations according to example embodiments. Referring to FIG. 6B, the system 640 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6C:
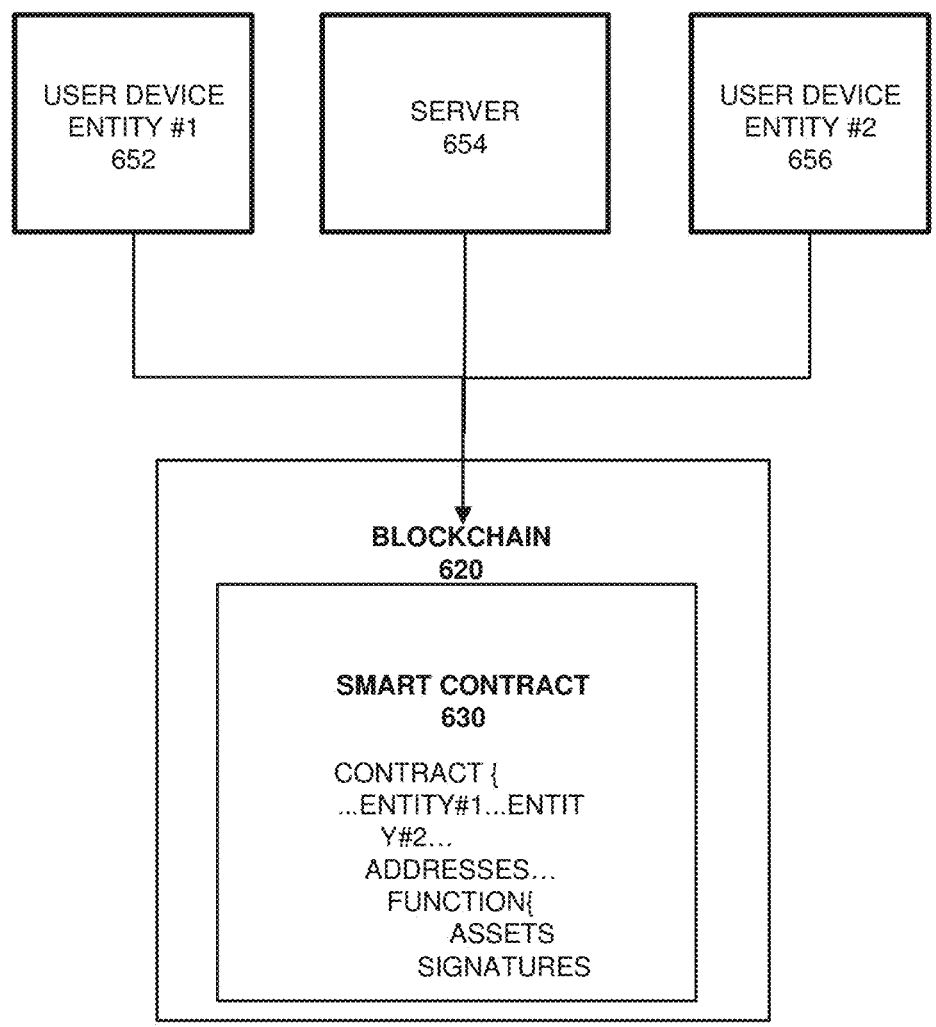
FIG. 6C is a diagram illustrating a further example system configured to utilize a smart contract, according to example embodiments.

FIG. 6C illustrates an example system configured to utilize a smart contract configuration among contracting parties and a mediating server configured to enforce the smart contract terms on the blockchain according to example embodiments. Referring to FIG. 6C, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
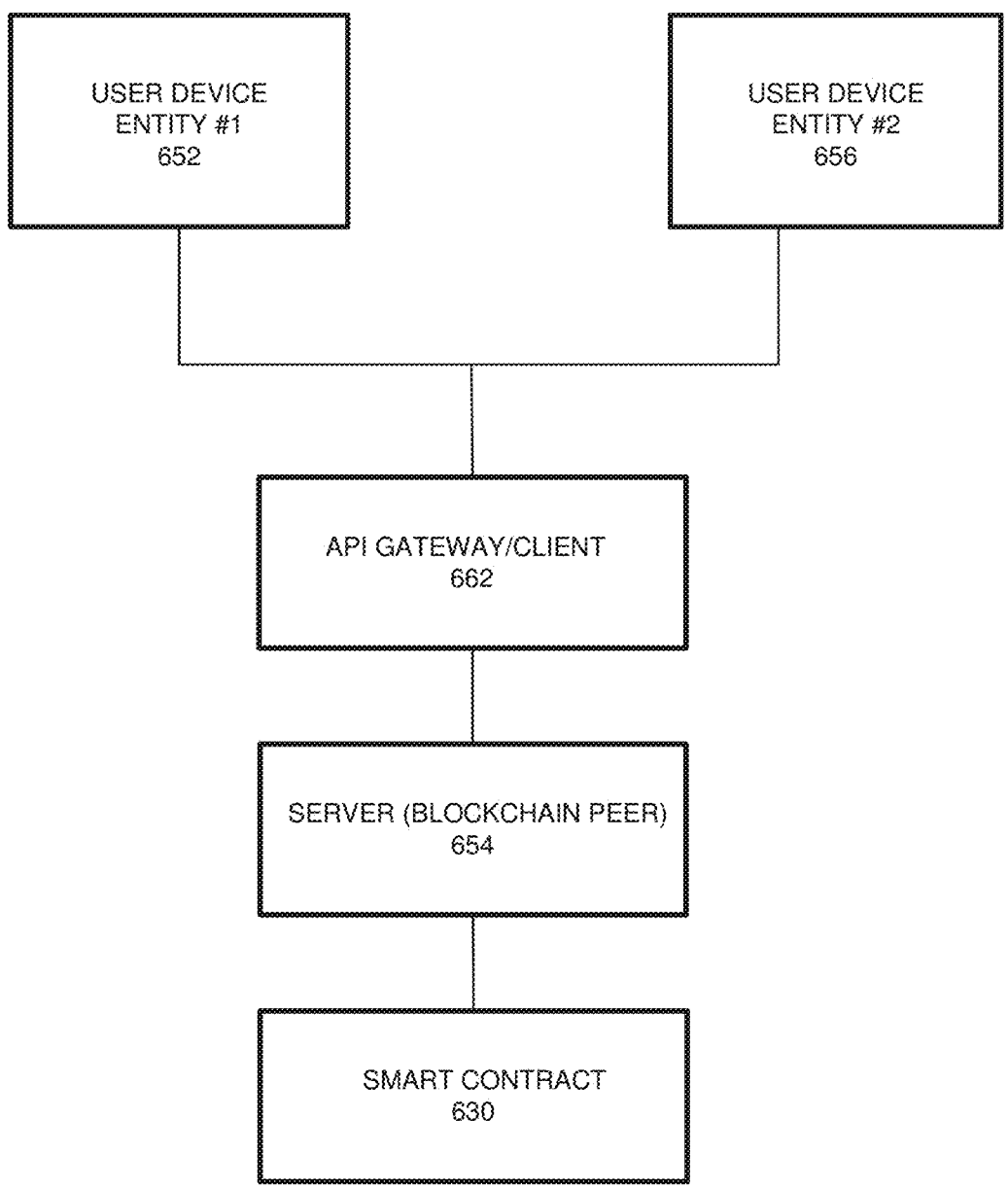
FIG. 6D is a diagram illustrating yet another example system configured to utilize a blockchain, according to example embodiments.

FIG. 6D illustrates a system 660 including a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.). In this example, the API gateway 662 is a common interface for performing transactions (invoke, queries, etc.) on the blockchain by connecting one or more entities 652 and 656 to a blockchain peer (i.e., server 654). Here, the server 654 is a blockchain network peer component that holds a copy of the world state and a distributed ledger allowing clients 652 and 656 to query data on the world state as well as submit transactions into the blockchain network where, depending on the smart contract 630 and endorsement policy, endorsing peers will run the smart contracts 630.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 7A:
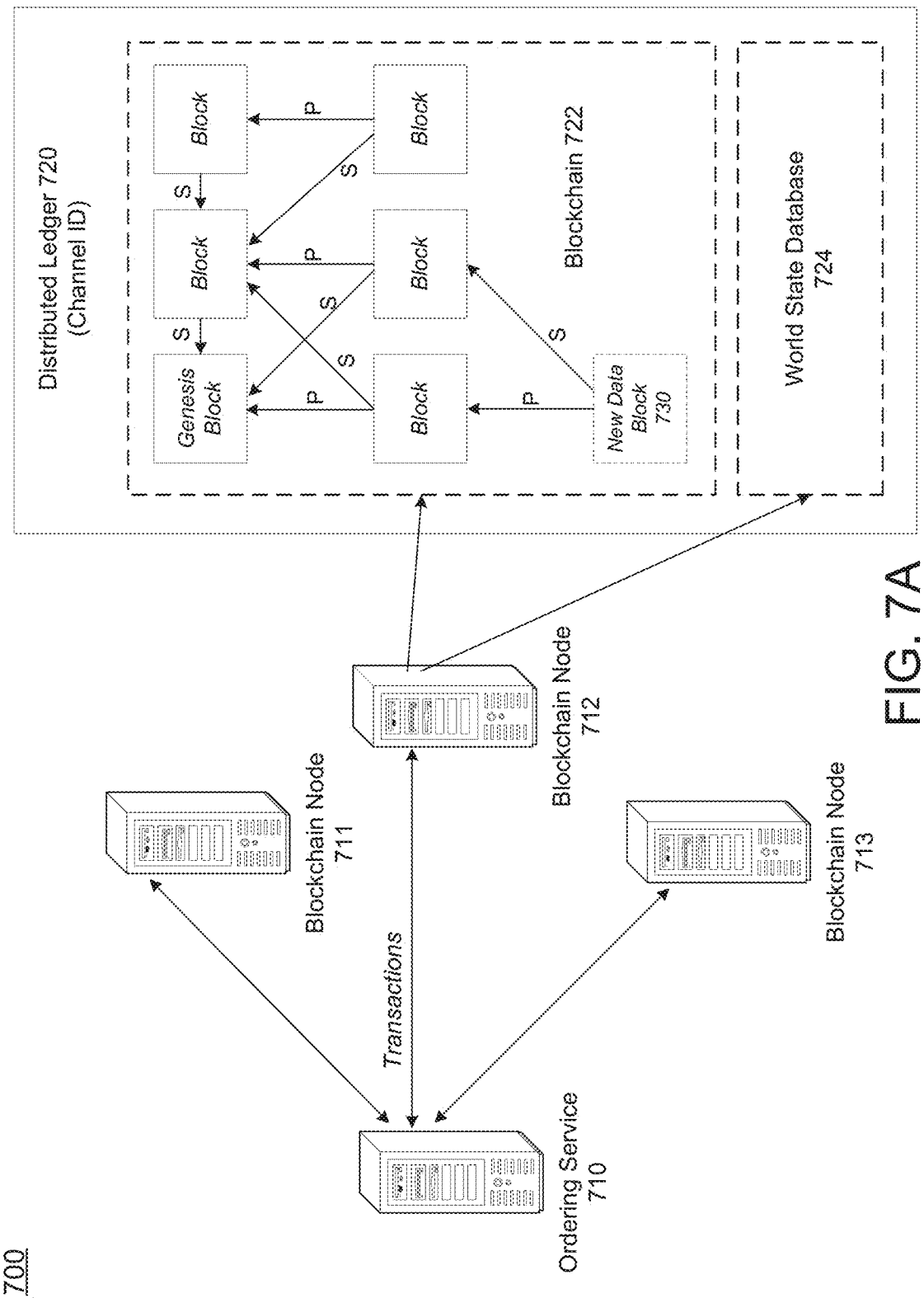
FIG. 7A is a diagram illustrating a process of a new block being added to a distributed ledger, according to example embodiments.
Figure 7B:
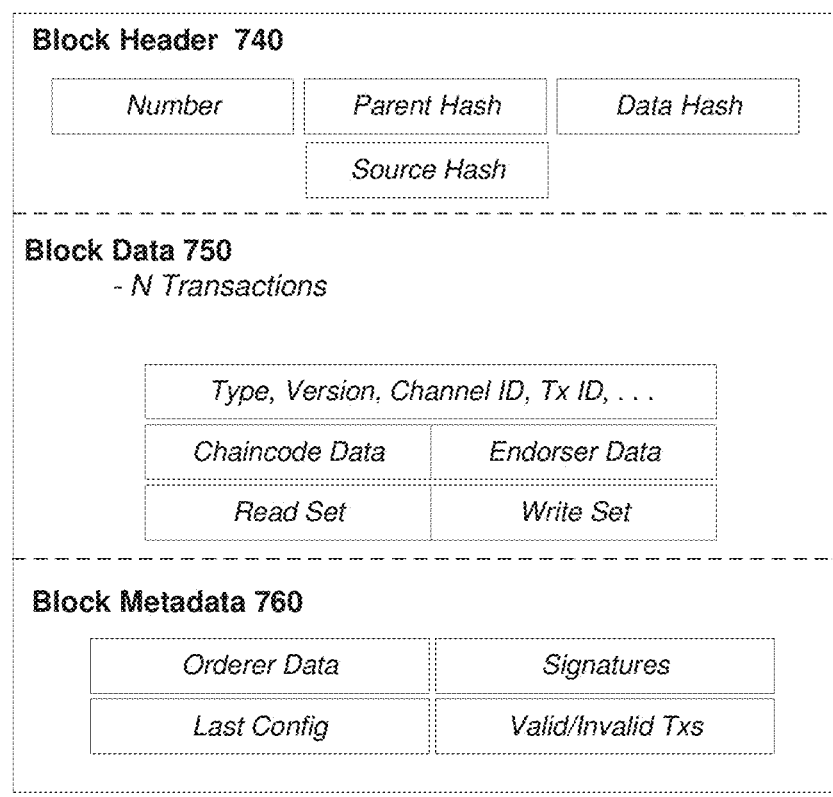
FIG. 7B is a diagram illustrating data contents of a new data block, according to example embodiments.

FIG. 7A illustrates a process 700 of a new block being added to a distributed ledger 720, according to example embodiments, and FIG. 7B illustrates contents of a new data block structure 730 for blockchain, according to example embodiments. Referring to FIG. 7A, clients (not shown) may submit transactions to blockchain nodes 711, 712, and/or 713. Clients may be instructions received from any source to enact activity on the blockchain 720. As an example, clients may be applications that act on behalf of a requester, such as a device, person or entity to propose transactions for the blockchain. The plurality of blockchain peers (e.g., blockchain nodes 711, 712, and 713) may maintain a state of the blockchain network and a copy of the distributed ledger 720. Different types of blockchain nodes/ peers may be present in the blockchain network including endorsing peers which simulate and endorse transactions proposed by clients and committing peers which verify endorsements, validate transactions, and commit transactions to the distributed ledger 720. In this example, the blockchain nodes 711, 712, and 713 may perform the role of endorser node, committer node, or both.

The distributed ledger 720 includes a blockchain which stores immutable, sequenced records in blocks, and a state database 724 (current world state) maintaining a current state of the blockchain 722. One distributed ledger 720 may exist per channel and each peer maintains its own copy of the distributed ledger 720 for each channel of which they are a member. The blockchain 722 is a transaction log, structured as hash-linked blocks where each block contains a sequence of N transactions. Blocks may include various components such as shown in FIG. 7B. The linking of the blocks (shown by arrows in FIG. 7A) may be generated by adding a hash of a parent block's header and a hash of a source block's header within a block header of a current block. In the example of FIG. 7A, parent block relationships are represented with a "P" while source block relationships are represented with an "S." In this example, all transactions on the blockchain 722 are sequenced and cryptographically linked together in a DAG structure preventing tampering with blockchain data without breaking the hash links. Furthermore, because of the links, the latest block in the blockchain 722 represents every transaction that has come before it. The blockchain 722 may be stored on a peer file system (local or attached storage), which supports an append-only blockchain workload.

The current state of the blockchain 722 and the distributed ledger 722 may be stored in the state database 724. Here, the current state data represents the latest values for all keys ever included in the chain transaction log of the blockchain 722. Chaincode invocations execute transactions against the current state in the state database 724. To make these chaincode interactions extremely efficient, the latest values of all keys are stored in the state database 724. The state database 724 may include an indexed view into the transaction log of the blockchain 722, it can therefore be regenerated from the chain at any time. The state database 724 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing nodes creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction". Different channels may have different endorsement policies. Endorsed transactions are forward by the client application to ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 712 is a committing peer that has received a new data new data block 730 for storage on blockchain 720. The first block in the blockchain may be referred to as a genesis block which includes information about the blockchain, its members, the data stored therein, etc.

The ordering service 710 may be made up of a cluster of orderers. The ordering service 710 does not process transactions, smart contracts, or maintain the shared ledger. Rather, the ordering service 710 may accept the endorsed transactions and specifies the order in which those transactions are committed to the distributed ledger 720. The architecture of the blockchain network may be designed such that the specific implementation of 'ordering' (e.g., Solo, Kafka, BFT, etc.) becomes a pluggable component.

Transactions are written to the distributed ledger 720 in a consistent order. The order of transactions is established to ensure that the updates to the state database 724 are valid when they are committed to the network. Unlike a cryptocurrency blockchain system (e.g., Bitcoin, etc.) where ordering occurs through the solving of a cryptographic puzzle, or mining, in this example the parties of the distributed ledger 720 may choose the ordering mechanism that best suits that network.

When the ordering service 710 initializes a new data block 730, the new data block 730 may be broadcast to committing peers (e.g., blockchain nodes 711, 712, and 713). In response, each committing peer validates the transaction within the new data block 730 by checking to make sure that the read set and the write set still match the current world state in the state database 724. Specifically, the committing peer can determine whether the read data that existed when the endorsers simulated the transaction is identical to the current world state in the state database 724. When the committing peer validates the transaction, the transaction is written to the blockchain 722 on the distributed ledger 720, and the state database 724 is updated with the write data from the read-write set. If a transaction fails, that is, if the committing peer finds that the read-write set does not match the current world state in the state database 724, the transaction ordered into a block will still be included in that block, but it will be marked as invalid, and the state database 724 will not be updated.

Referring to FIG. 7B, a new data block 730 (also referred to as a data block) that is stored on the blockchain 722 of the distributed ledger 720 may include multiple data segments such as a block header 740, block data 750, and block metadata 760. It should be appreciated that the various depicted blocks and their contents, such as new data block 730 and its contents. shown in FIG. 7B are merely examples and are not meant to limit the scope of the example embodiments. The new data block 730 may store transactional information of N transaction(s) (e.g., 1, 10, 100, 500, 1000, 2000, 3000, etc.) within the block data 750. The new data block 730 may also include a link to a parent block and a source block in the DAG structure within the block header 740. In particular, the block header 740 may include a hash of a parent block's header and a hash of a source block's header. The block header 740 may also include a unique block number, a hash of the block data 750 of the new data block 730, and the like. The block number of the new data block 730 may be unique and assigned in various orders, such as an incremental/sequential order starting from zero.

The block data 750 may store transactional information of each transaction that is recorded within the new data block 730. For example, the transaction data may include one or more of a type of the transaction, a version, a timestamp, a channel ID of the distributed ledger 720, a transaction ID, an epoch, a payload visibility, a chaincode path (deploy tx), a chaincode name, a chaincode version, input (chaincode and functions), a client (creator) identify such as a public key and certificate, a signature of the client, identities of endorsers (if any), endorser signatures (if any), a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

The block metadata 760 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committer of the block (such as blockchain node 712) may add validity/invalidity information based on an endorsement policy, verification of read/write sets, and the like. The transaction filter may include a byte array of a size equal to the number of transactions in the block data 750 and a validation code identifying whether a transaction was valid/invalid.

Figure 7C:
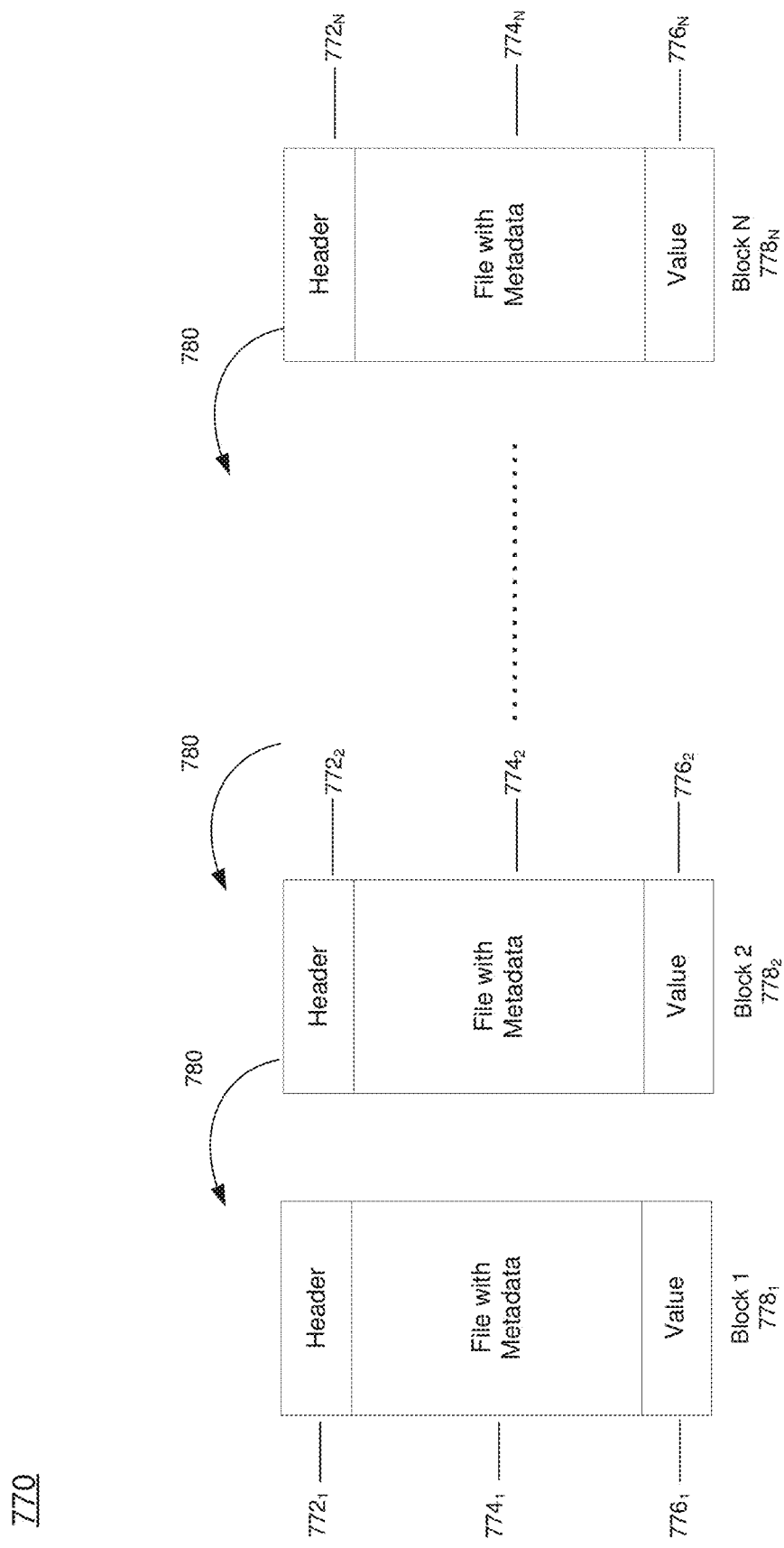
FIG. 7C is a diagram illustrating a blockchain for digital content, according to example embodiments.

FIG. 7C illustrates an embodiment of a blockchain 770 for digital content in accordance with the embodiments described herein. The digital content may include one or more files and associated information. The files may include media, images, video, audio, text, links, graphics, animations, web pages, documents, or other forms of digital content. The immutable, append-only aspects of the blockchain serve as a safeguard to protect the integrity, validity, and authenticity of the digital content, making it suitable use in legal proceedings where admissibility rules apply or other settings where evidence is taken into consideration or where the presentation and use of digital information is otherwise of interest. In this case, the digital content may be referred to as digital evidence.

The blockchain may be formed in various ways. In one embodiment, the digital content may be included in and accessed from the blockchain itself. For example, each block of the blockchain may store a hash value of reference information (e.g., header, value, etc.) along the associated digital content. The hash value and associated digital content may then be encrypted together. Thus, the digital content of each block may be accessed by decrypting each block in the blockchain, and the hash value of each block may be used as a basis to reference a previous block. This may be illustrated as follows:

| Block 1 | Block 2 | ... | Block N |
|---|---|---|---|
| Parent Hash Value 1 | Parent Hash Value 2 | | Parent Hash Value N |
| Source Hash Value 1 | Source Hash Value 2 | | Source Hash Value N |
| Digital Content 1 | Digital Content 2 | | Digital Content N |

In one embodiment, the digital content may be not included in the blockchain. For example, the blockchain may store the encrypted hashes of the content of each block without any of the digital content. The digital content may be stored in another storage area or memory address in association with the hash value of the original file. The other storage area may be the same storage device used to store the blockchain or may be a different storage area or even a separate relational database. The digital content of each block may be referenced or accessed by obtaining or querying the hash value of a block of interest and then looking up that has value in the storage area, which is stored in correspondence with the actual digital content. This operation may be performed, for example, a database gatekeeper. This may be illustrated as follows:

| Blockchain | Storage Area |
|---|---|
| Block 1 Hash Value | Block 1 Hash Value . . . Content |
| . | . |
| . | . |
| . | . |
| Block N Hash Value | Block N Hash Value . . . Content |

In the example embodiment of FIG. 7C, the blockchain 770 includes a number of blocks $778_1$, $778_2$, . . . $778_N$ cryptographically linked in an ordered sequence, where N≥1. The encryption used to link the blocks $778_1$, $778_2$, . . . $778_N$ may be any of a number of keyed or un-keyed Hash functions. In one embodiment, the blocks $778_1$, $778_2$, . . . $778_N$ are subject to a hash function which produces n-bit alphanumeric outputs (where n is 256 or another number) from inputs that are based on information in the blocks. Examples of such a hash function include, but are not limited to, a SHA-type (SHA stands for Secured Hash Algorithm) algorithm, Merkle-Damgard algorithm, HAIFA algorithm, Merkle-tree algorithm, nonce-based algorithm, and a non-collision-resistant PRF algorithm. In another embodiment, the blocks $778_1$, $778_2$, . . . , $778_N$ may be cryptographically linked by a function that is different from a hash function. For purposes of illustration, the following description is made with reference to a hash function, e.g., SHA-2.

Each of the blocks $778_1$, $778_2$, . . . , $778_N$ in the blockchain includes a header, a version of the file, and a value. The header and the value are different for each block as a result of hashing in the blockchain. In one embodiment, the value may be included in the header. As described in greater detail below, the version of the file may be the original file or a different version of the original file.

The first block $778_1$ in the blockchain is referred to as the genesis block and includes the header $772_1$, original file $774_1$, and an initial value $776_1$. The hashing scheme used for the genesis block, and indeed in all subsequent blocks, may vary. For example, all the information in the first block $778_1$ may be hashed together and at one time, or each or a portion of the information in the first block $778_1$ may be separately hashed and then a hash of the separately hashed portions may be performed.

The header $772_1$ may include one or more initial parameters, which, for example, may include a version number, timestamp, nonce, root information, difficulty level, consensus protocol, duration, media format, source, descriptive keywords, and/or other information associated with original file $774_1$ and/or the blockchain. The header $772_1$ may be generated automatically (e.g., by blockchain network managing software) or manually by a blockchain participant.

Unlike the header in other blocks $778_2$ to $778_N$ in the blockchain, the header $772_1$ in the genesis block does not reference a previous block, simply because there is no previous block.

The original file $774_1$ in the genesis block may be, for example, data as captured by a device with or without processing prior to its inclusion in the blockchain. The original file $774_1$ is received through the interface of the system from the device, media source, or node. The original file $774_1$ is associated with metadata, which, for example, may be generated by a user, the device, and/or the system processor, either manually or automatically. The metadata may be included in the first block $778_1$ in association with the original file $774_1$.

The value $776_1$ in the genesis block is an initial value generated based on one or more unique attributes of the original file $774_1$. In one embodiment, the one or more unique attributes may include the hash value for the original file $774_1$, metadata for the original file $774_1$, and other information associated with the file. In one implementation, the initial value $776_1$ may be based on the following unique attributes:

1) SHA-2 computed hash value for the original file
2) originating device ID
3) starting timestamp for the original file
4) initial storage location of the original file
5) blockchain network member ID for software to currently control the original file and associated metadata The other blocks $778_2$ to $778_N$ in the blockchain also have headers, files, and values. However, unlike the first block $772_1$, each of the headers $772_2$ to $772_N$ in the other blocks includes the hash value of a parent block and a source block in the DAG structure. The hash value may be just the hash of the header of the block or may be the hash value of the entire block. By including the hash value of a parent block and a source block in each of the remaining blocks, a trace can be performed from the Nth block back to the genesis block (and the associated original file) on a block-by-block basis, as indicated by arrows 780, to establish an auditable and immutable chain-of-custody.

Each of the header $772_2$ to $772_N$ in the other blocks may also include other information, e.g., version number, timestamp, nonce, root information, difficulty level, consensus protocol, and/or other parameters or information associated with the corresponding files and/or the blockchain in general.

The files $774_2$ to $774_N$ in the other blocks may be equal to the original file or may be a modified version of the original file in the genesis block depending, for example, on the type of processing performed. The type of processing performed may vary from block to block. The processing may involve, for example, any modification of a file in a preceding block, such as redacting information or otherwise changing the content of, taking information away from, or adding or appending information to the files.

Additionally, or alternatively, the processing may involve merely copying the file from a preceding block, changing a storage location of the file, analyzing the file from one or more preceding blocks, moving the file from one storage or memory location to another, or performing action relative to the file of the blockchain and/or its associated metadata. Processing which involves analyzing a file may include, for example, appending, including, or otherwise associating various analytics, statistics, or other information associated with the file.

The values in each of the other blocks $776_2$ to $776_N$ in the other blocks are unique values and are all different as a result of the processing performed. For example, the value in any one block corresponds to an updated version of the value in the previous block. The update is reflected in the hash of the block to which the value is assigned. The values of the blocks therefore provide an indication of what processing was performed in the blocks and also permit a tracing through the blockchain back to the original file. This tracking confirms the chain-of-custody of the file throughout the entire blockchain.

For example, consider the case where portions of the file in a previous block are redacted, blocked out, or pixelated in order to protect the identity of a person shown in the file. In this case, the block including the redacted file will include metadata associated with the redacted file, e.g., how the redaction was performed, who performed the redaction, timestamps where the redaction(s) occurred, etc. The metadata may be hashed to form the value. Because the metadata for the block is different from the information that was hashed to form the value in the previous block, the values are different from one another and may be recovered when decrypted.

Figure 7D:
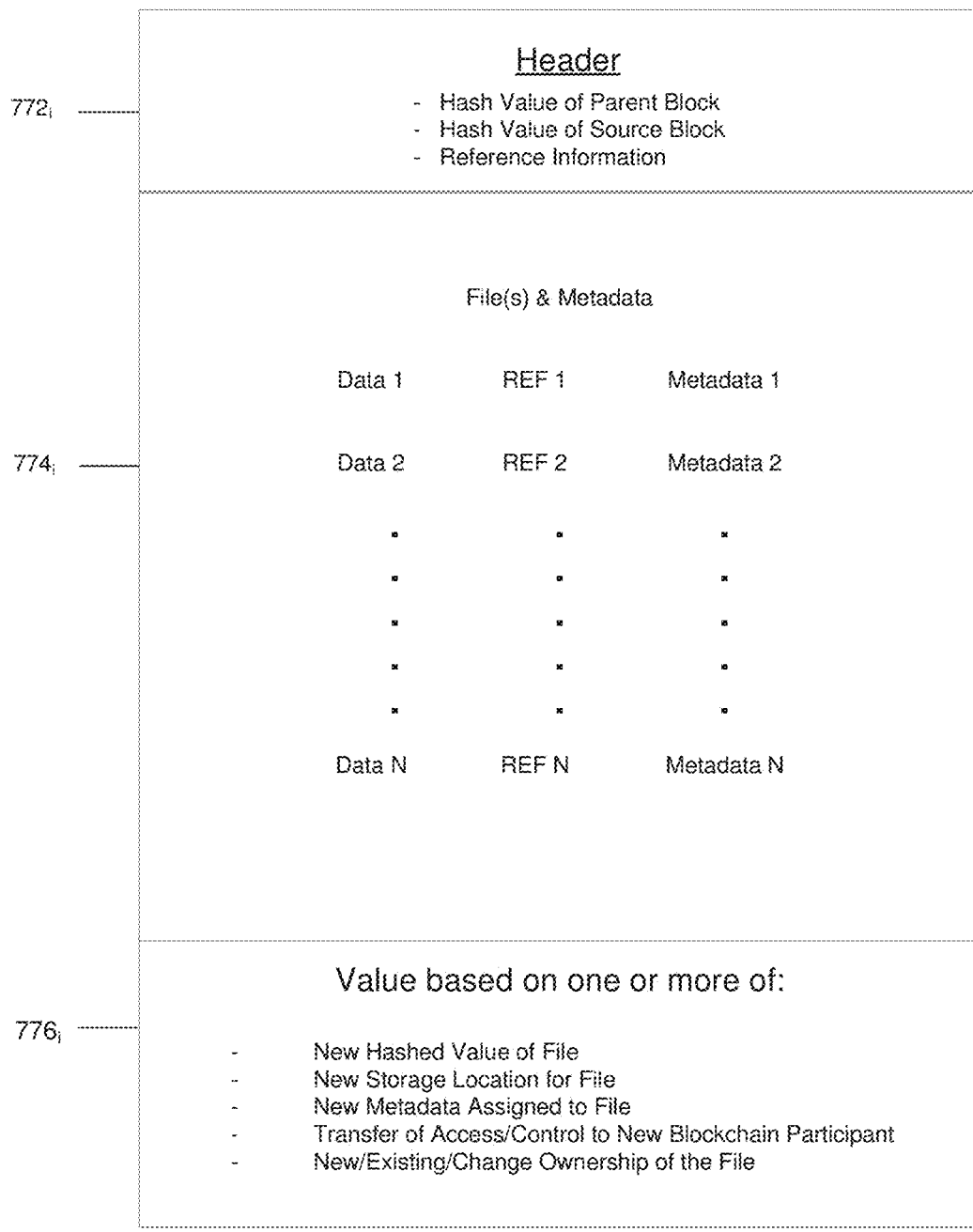
FIG. 7D is a diagram illustrating a block which may represent the structure of blocks in the blockchain, according to example embodiments.

In one embodiment, the value of a previous block may be updated (e.g., a new hash value computed) to form the value of a current block when any one or more of the following occurs. The new hash value may be computed by hashing all or a portion of the information noted below, in this example embodiment.

a) new SHA-2 computed hash value if the file has been processed in any way (e.g., if the file was redacted, copied, altered, accessed, or some other action was taken)
b) new storage location for the file
c) new metadata identified associated with the file
d) transfer of access or control of the file from one blockchain participant to another blockchain participant FIG. 7D illustrates an embodiment of a block which may represent the structure of the blocks in the blockchain 790 in accordance with one embodiment. The block, $Block_i$, includes a header $772_i$, a file $774_i$, and a value $776_i$.

The header $772_i$ includes a hash value of a parent block $Block_{i-1}$ as well as a source Block and additional reference information, which, for example, may be any of the types of information (e.g., header information including references, characteristics, parameters, etc.) discussed herein. All blocks may reference the hash of a parent block and a source block in the DAG structure except, of course, the genesis block and possibly a few of the first blocks added after the genesis block. The hash value may be just a hash of the header in the previous block or a hash of all or a portion of the information in the previous block, including the file and metadata.

The file $774_i$ includes a plurality of data, such as Data 1, Data 2, . . . , Data N in sequence. The data are tagged with metadata Metadata 1, Metadata 2, . . . , Metadata N which describe the content and/or characteristics associated with the data. For example, the metadata for each data may include information to indicate a timestamp for the data, process the data, keywords indicating the persons or other content depicted in the data, and/or other features that may be helpful to establish the validity and content of the file as a whole, and particularly its use a digital evidence, for example, as described in connection with an embodiment discussed below. In addition to the metadata, each data may be tagged with reference $REF_1$, $REF_2$, . . . , $REF_N$ to a previous data to prevent tampering, gaps in the file, and sequential reference through the file.

Once the metadata is assigned to the data (e.g., through a smart contract), the metadata cannot be altered without the hash changing, which can easily be identified for invalidation. The metadata, thus, creates a data log of information that may be accessed for use by participants in the blockchain.

The value $776_i$ is a hash value or other value computed based on any of the types of information previously discussed. For example, for any given block $Block_i$, the value for that block may be updated to reflect the processing that was performed for that block, e.g., new hash value, new storage location, new metadata for the associated file, transfer of control or access, identifier, or other action or information to be added. Although the value in each block is shown to be separate from the metadata for the data of the file and header, the value may be based, in part or whole, on this metadata in another embodiment.

Once the blockchain 770 is formed, at any point in time, the immutable chain-of-custody for the file may be obtained by querying the blockchain for the transaction history of the values across the blocks. This query, or tracking procedure, may begin with decrypting the value of the block that is most currently included (e.g., the last ($N^{th}$) block), and then continuing to decrypt the value of the other blocks until the genesis block is reached and the original file is recovered. The decryption may involve decrypting the headers and files and associated metadata at each block, as well.

Decryption is performed based on the type of encryption that took place in each block. This may involve the use of private keys, public keys, or a public key-private key pair. For example, when asymmetric encryption is used, blockchain participants or a processor in the network may generate a public key and private key pair using a predetermined algorithm. The public key and private key are associated with each other through some mathematical relationship. The public key may be distributed publicly to serve as an address to receive messages from other users, e.g., an IP address or home address. The private key is kept secret and used to digitally sign messages sent to other blockchain participants. The signature is included in the message so that the recipient can verify using the public key of the sender. This way, the recipient can be sure that only the sender could have sent this message.

Generating a key pair may be analogous to creating an account on the blockchain, but without having to actually register anywhere. Also, every transaction that is executed on the blockchain is digitally signed by the sender using their private key. This signature ensures that only the owner of the account can track and process (if within the scope of permission determined by a smart contract) the file of the blockchain.

Figure 8A:
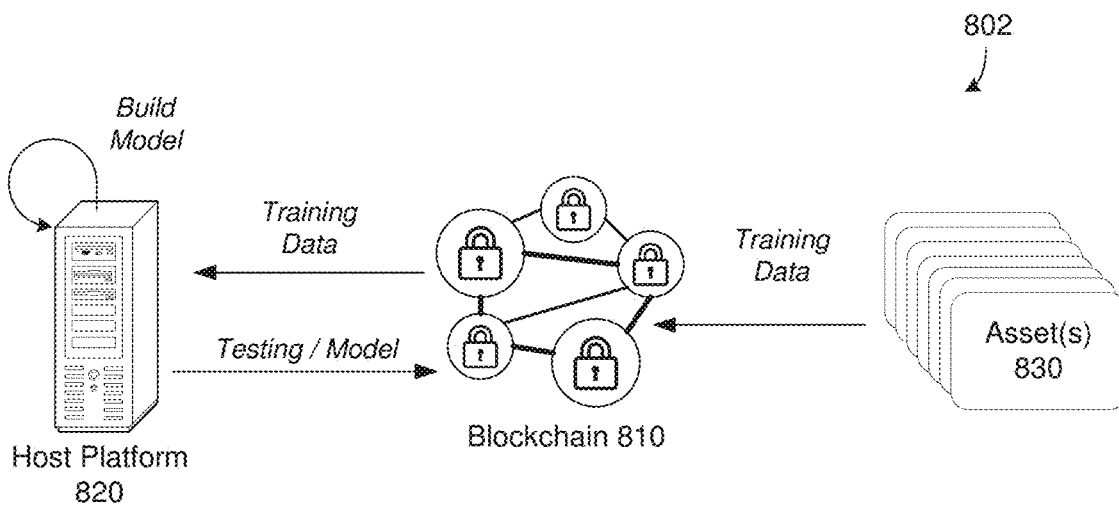
FIG. 8A is a diagram illustrating an example blockchain which stores machine learning (artificial intelligence) data, according to example embodiments.
Figure 8A:
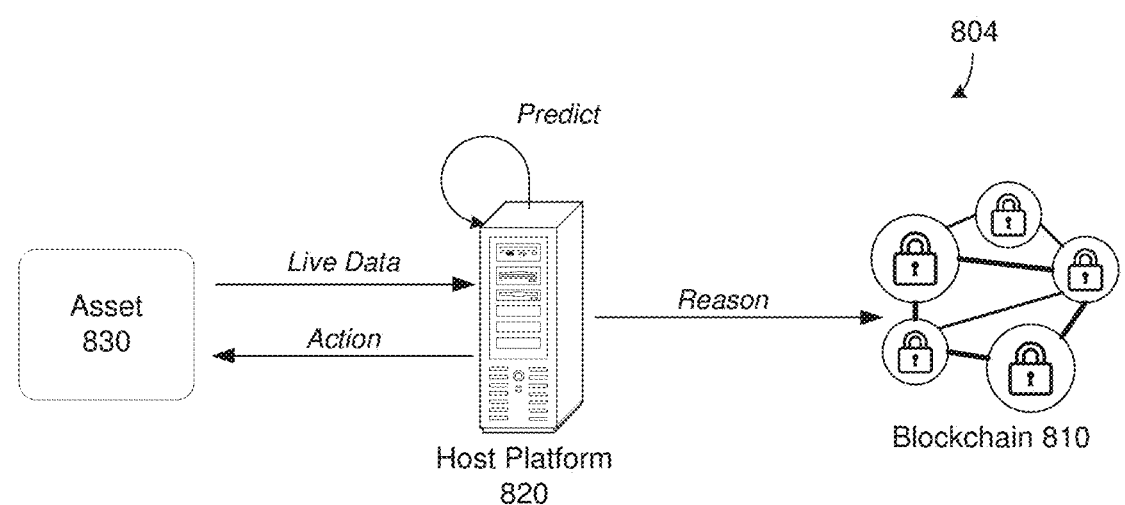
Figure 8B:
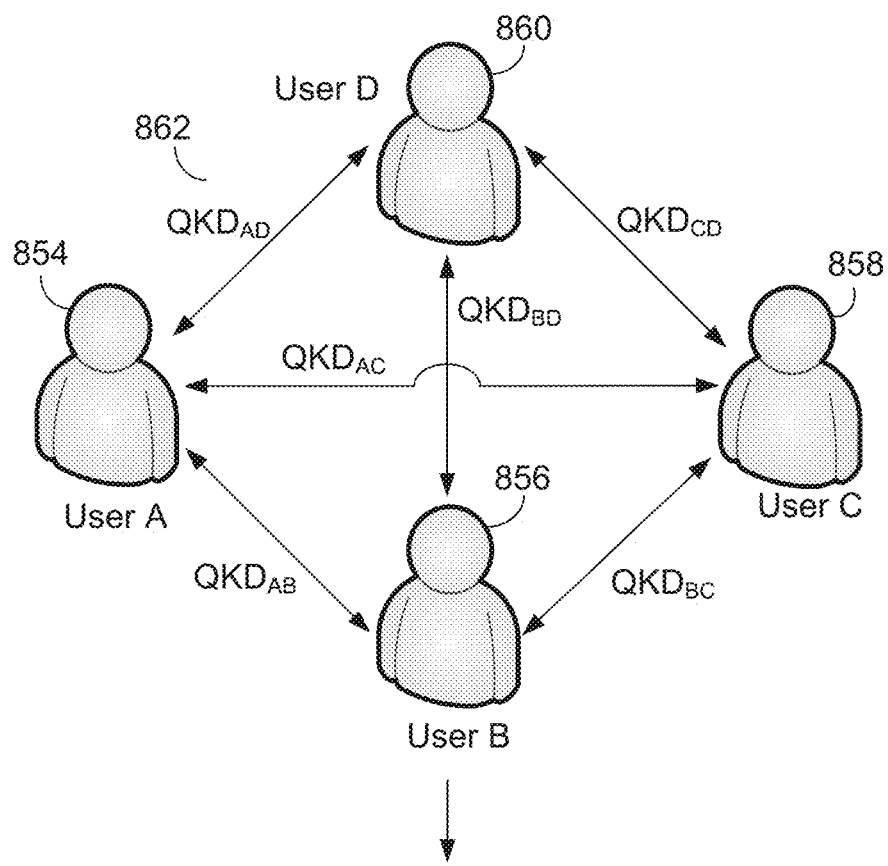
FIG. 8B is a diagram illustrating an example quantum-secure blockchain, according to example embodiments.

FIGS. 8A and 8B illustrate additional examples of use cases for blockchain which may be incorporated and used herein. In particular, FIG. 8A illustrates an example 800 of a blockchain 810 which stores machine learning (artificial intelligence) data. Machine learning relies on vast quantities of historical data (or training data) to build predictive models for accurate prediction on new data. Machine learning software (e.g., neural networks, etc.) can often sift through millions of records to unearth non-intuitive patterns.

In the example of FIG. 8A, a host platform 820 builds and deploys a machine learning model for predictive monitoring of assets 830. Here, the host platform 820 may be a cloud platform, an industrial server, a web server, a personal computer, a user device, and the like. Assets 830 can be any type of asset (e.g., machine or equipment, etc.) such as an aircraft, locomotive, turbine, medical machinery and equipment, oil and gas equipment, boats, ships, vehicles, and the like. As another example, assets 830 may be non-tangible assets such as stocks, currency, digital coins, insurance, or the like.

The blockchain 810 can be used to significantly improve both a training process 802 of the machine learning model and a predictive process 804 based on a trained machine learning model. For example, in 802, rather than requiring a data scientist/engineer or other user to collect the data, historical data may be stored by the assets 830 themselves (or through an intermediary, not shown) on the blockchain 810. This can significantly reduce the collection time needed by the host platform 820 when performing predictive model training. For example, using smart contracts, data can be directly and reliably transferred straight from its place of origin to the blockchain 810. By using the blockchain 810 to ensure the security and ownership of the collected data, smart contracts may directly send the data from the assets to the individuals that use the data for building a machine learning model. This allows for sharing of data among the assets 830.

The collected data may be stored in the blockchain 810 based on a consensus mechanism. The consensus mechanism pulls in (permissioned nodes) to ensure that the data being recorded is verified and accurate. The data recorded is time-stamped, cryptographically signed, and immutable. It is therefore auditable, transparent, and secure. Adding IoT devices which write directly to the blockchain can, in certain cases (i.e. supply chain, healthcare, logistics, etc.), increase both the frequency and accuracy of the data being recorded.

Furthermore, training of the machine learning model on the collected data may take rounds of refinement and testing by the host platform 820. Each round may be based on additional data or data that was not previously considered to help expand the knowledge of the machine learning model. In 802, the different training and testing steps (and the data associated therewith) may be stored on the blockchain 810 by the host platform 820. Each refinement of the machine learning model (e.g., changes in variables, weights, etc.) may be stored on the blockchain 810. This provides verifiable proof of how the model was trained and what data was used to train the model. Furthermore, when the host platform 820 has achieved a finally trained model, the resulting model may be stored on the blockchain 810.

After the model has been trained, it may be deployed to a live environment where it can make predictions/decisions based on the execution of the final trained machine learning model. For example, in 804, the machine learning model may be used for condition-based maintenance (CBM) for an asset such as an aircraft, a wind turbine, a healthcare machine, and the like. In this example, data fed back from the asset 830 may be input the machine learning model and used to make event predictions such as failure events, error codes, and the like. Determinations made by the execution of the machine learning model at the host platform 820 may be stored on the blockchain 810 to provide auditable/verifiable proof. As one non-limiting example, the machine learning model may predict a future breakdown/failure to a part of the asset 830 and create alert or a notification to replace the part. The data behind this decision may be stored by the host platform 820 on the blockchain 810. In one embodiment the features and/or the actions described and/or depicted herein can occur on or with respect to the blockchain 810.

New transactions for a blockchain can be gathered together into a new block and added to an existing hash value. This is then encrypted to create a new hash for the new block. This is added to the next list of transactions when they are encrypted, and so on. The result is a chain of blocks that each contain the hash values of previous blocks. Computers that store these blocks regularly compare their hash values to ensure that they are all in agreement. Any computer that does not agree, discards the records that are causing the problem. This approach is good for ensuring tamper-resistance of the blockchain, but it is not perfect.

One way to game this system is for a dishonest user to change the list of transactions in their favor, but in a way that leaves the hash unchanged. This can be done by brute force, in other words by changing a record, encrypting the result, and seeing whether the hash value is the same. And if not, trying again and again and again until it finds a hash that matches. The security of blockchains is based on the belief that ordinary computers can only perform this kind of brute force attack over time scales that are entirely impractical, such as the age of the universe. By contrast, quantum computers are much faster (1000s of times faster) and consequently pose a much greater threat.

FIG. 8B illustrates an example 850 of a quantum-secure blockchain 852 which implements quantum key distribution (QKD) to protect against a quantum computing attack. In this example, blockchain users can verify each other's identities using QKD. This sends information using quantum particles such as photons, which cannot be copied by an eavesdropper without destroying them. In this way, a sender and a receiver through the blockchain can be sure of each other's identity.

In the example of FIG. 8B, four users are present 854, 856, 858, and 860. Each of pair of users may share a secret key 862 (i.e., a QKD) between themselves. Since there are four nodes in this example, six pairs of nodes exists, and therefore six different secret keys 862 are used including $QKD_{AB}$, $QKD_{AC}$, $QKD_{AD}$, $QKD_{BC}$, $QKD_{BD}$, and $QKD_{CD}$. Each pair can create a QKD by sending information using quantum particles such as photons, which cannot be copied by an eavesdropper without destroying them. In this way, a pair of users can be sure of each other's identity.

The operation of the blockchain 852 is based on two procedures (i) creation of transactions, and (ii) construction of blocks that aggregate the new transactions. New transactions may be created similar to a traditional blockchain network. Each transaction may contain information about a sender, a receiver, a time of creation, an amount (or value) to be transferred, a list of reference transactions that justifies the sender has funds for the operation, and the like. This transaction record is then sent to all other nodes where it is entered into a pool of unconfirmed transactions. Here, two parties (i.e., a pair of users from among 854-860) authenticate the transaction by providing their shared secret key 862 (QKD). This quantum signature can be attached to every transaction making it exceedingly difficult to tamper with. Each node checks their entries with respect to a local copy of the blockchain 852 to verify that each transaction has sufficient funds. However, the transactions are not yet confirmed.

Rather than perform a traditional mining process on the blocks, the blocks may be created in a decentralized manner using a broadcast protocol. At a predetermined period of time (e.g., seconds, minutes, hours, etc.) the network may apply the broadcast protocol to any unconfirmed transaction thereby to achieve a Byzantine agreement (consensus) regarding a correct version of the transaction. For example, each node may possess a private value (transaction data of that particular node). In a first round, nodes transmit their private values to each other. In subsequent rounds, nodes communicate the information they received in the previous round from other nodes. Here, honest nodes are able to create a complete set of transactions within a new block. This new block can be added to the blockchain 852. In one embodiment the features and/or the actions described and/or depicted herein can occur on or with respect to the blockchain 852.

Figure 9:
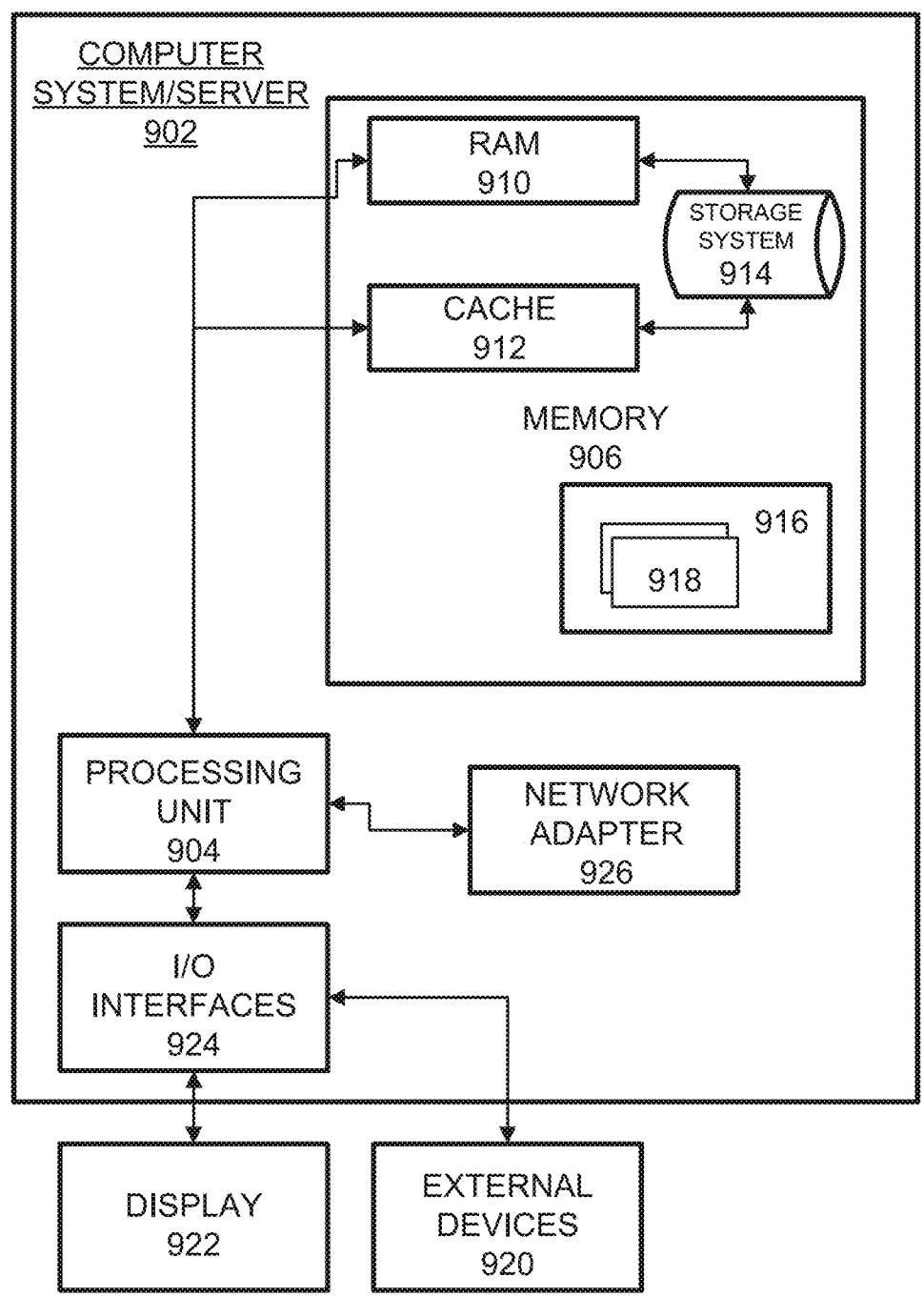
FIG. 9 is a diagram illustrating an example system that supports one or more of the example embodiments.

FIG. 9 illustrates an example system 900 that supports one or more of the example embodiments described and/or depicted herein. The system 900 comprises a computer system/server 902, which is operational with numerous other general purpose or special purpose computing system environments or configurations. Examples of well-known computing systems, environments, and/or configurations that may be suitable for use with computer system/server 902 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 902 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 902 in cloud computing node 900 is shown in the form of a general-purpose computing device. The components of computer system/server 902 may include, but are not limited to, one or more processors or processing units 904, a system memory 906, and a bus that couples various system components including system memory 906 to processor 904.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media. System memory 906, in one embodiment, implements the flow diagrams of the other figures. The system memory 906 can include computer system readable media in the form of volatile memory, such as random-access memory (RAM) 910 and/or cache memory 912. Computer system/server 902 may further include other removable/non-removable, volatile/non-volatile computer system storage media. By way of example only, storage system 914 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 906 may include at least one program product having a set (e.g., at least one) of program modules that are configured to carry out the functions of various embodiments of the application.

Program/utility 916, having a set (at least one) of program modules 918, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. Program modules 918 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 902 may also communicate with one or more external devices 920 such as a keyboard, a pointing device, a display 922, etc.; one or more devices that enable a user to interact with computer system/server 902; and/or any devices (e.g., network card, modem, etc.) that enable computer system/server 902 to communicate with one or more other computing devices. Such communication can occur via I/O interfaces 924. Still yet, computer system/server 902 can communicate with one or more networks such as a local area network (LAN), a general wide area network (WAN), and/or a public network (e.g., the Internet) via network adapter 926. As depicted, network adapter 926 communicates with the other components of computer system/server 902 via a bus. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A computing system comprising:
a processor configured to
receive a chain of blocks from a blockchain which comprises a directed acyclic graph (DAG) format in which two or more blocks are independently hash-linked to a shared parent block,
identify temporal relationships between the two or more blocks that are independently hash-linked to the shared parent block based on random gossip between blockchain peers of the blockchain, and
determine a sequential linear order of the chain of blocks in the DAG format based on the identified temporal relationships; and
a storage configured to store the sequential linear order of the chain of blocks.

2. The computing system of claim 1, wherein the processor is further configured to perform a blockchain consensus process with a plurality of peer nodes based on the sequential linear order of the chain of blocks.

3. The computing system of claim 1, wherein the chain of blocks in the DAG format comprise a plurality of subsets of linear chains of blocks of a plurality of peers, where the plurality of subsets of linear chains of blocks comprise interconnections therebetween based on the random gossip.

4. The computing system of claim 1, wherein the processor is configured to generate a graph in the DAG format that comprises nodes that correspond to the blocks with edges therebetween that correspond to hash links, and identify the temporal relationships based on a structure of the edges between the nodes on the graph.

5. The computing system of claim 4, wherein the processor is configured to transform a parent relationship on the graph via addition of an edge from a child node to a node that is linked to a parent node of the child node, and remove an edge between the child node and the parent node.

6. The computing system of claim 4, wherein the processor is configured to transform cyclical nodes on the graph via aggregation of nodes that have a same relative temporal relationship into a single cycle node which encompasses the aggregated nodes.

7. The computing system of claim 6, wherein the processor is further configured to create an order among the aggregated nodes encompassed in the single cycle node based on a predefined protocol.

8. The computing system of claim 4, wherein the processor is configured to identify two different paths between a pair of nodes on the graph, and remove a shorter path between the pair of nodes among the two different paths.

9. A method comprising:
receiving a chain of blocks from a blockchain comprising a directed acyclic graph (DAG) format in which two or more blocks are independently hash-linked to a shared parent block;
identifying temporal relationships between the two or more blocks that are independently hash-linked to the shared parent block based on random gossip between blockchain peers of the blockchain;
determining a sequential linear order of the chain of blocks in the DAG format based on the identified temporal relationships; and
storing the sequential linear order of the chain of blocks.

10. The method of claim 9, further comprising performing a blockchain consensus process with a plurality of peer nodes based on the sequential linear order of the chain of blocks.

11. The method of claim 9, wherein the chain of blocks in the DAG format comprises a plurality of subsets of linear chains of blocks of a plurality of peers, where the plurality of subsets of linear chains of blocks comprise interconnections therebetween based on the random gossip.

12. The method of claim 9, wherein the identifying comprises generating a graph in the DAG format comprising nodes corresponding to the blocks with edges therebetween corresponding to hash links, and the identifying temporal relationships comprises identifying the temporal relationships based on a structure of the edges between the nodes on the graph.

13. The method of claim 12, wherein the identifying comprises transforming a parent relationship on the graph via addition of an edge from a child node to a node that is linked to a parent node of the child node, and removing an edge between the child node and the parent node.

14. The method of claim 12, wherein the identifying comprises transforming cyclical nodes on the graph via aggregation of nodes having a same relative temporal relationship into a single cycle node which encompasses the aggregated nodes.

15. The method of claim 14, wherein the transforming the cycle nodes further comprises creating an order among the aggregated nodes encompassed in the single cycle node based on a predefined protocol.

16. The method of claim 12, wherein the identifying comprises identifying two different paths between a pair of nodes on the graph, and removing a shorter path between the pair of nodes among the two different paths.

17. A non-transitory computer-readable medium comprising instructions, that when read by a processor, cause the processor to perform a method comprising:
receiving a chain of blocks from a blockchain comprising a directed acyclic graph (DAG) format in which two or more blocks are independently hash-linked to a shared parent block;
identifying temporal relationships between the two or more blocks that are independently hash-linked to the shared parent block based on random gossip between blockchain peers of the blockchain;
determining a sequential linear order of the chain of blocks in the DAG format based on the identified temporal relationships; and
storing the sequential linear order of the chain of blocks.

18. The non-transitory computer-readable medium of claim 17, further comprising performing a blockchain consensus process with a plurality of peer nodes based on the sequential linear order of the chain of blocks.

19. The non-transitory computer-readable medium of claim 17, wherein the chain of blocks in the DAG format comprises a plurality of subsets of linear chains of blocks of a plurality of peers, where the plurality of subsets of linear chains of blocks comprise interconnections therebetween based on the random gossip.

20. The non-transitory computer-readable medium of claim 17, wherein the identifying comprises generating a graph in the DAG format comprising nodes corresponding to the blocks with edges therebetween corresponding to hash links, and the identifying the temporal relationships comprises identifying the temporal relationships based on a structure of the edges between the nodes on the graph.

* * * * *